United States Patent
Arora et al.

(10) Patent No.: US 12,463,972 B2
(45) Date of Patent: Nov. 4, 2025

(54) SYSTEM AND METHOD TO IDENTIFY AND REVERSE TAMPERING OF VIRTUAL IMAGES

(71) Applicant: Bank of America Corporation, Charlotte, NC (US)

(72) Inventors: Saurabh Arora, Harayana (IN); Sandeep Kumar Chauhan, Telangana (IN); Jhalak Khurana, Haryana (IN)

(73) Assignee: Bank of America Corporation, Charlotte, NC (US)

( * ) Notice: Subject to any disclaimer, the term of this patent is extended or adjusted under 35 U.S.C. 154(b) by 394 days.

(21) Appl. No.: 18/301,409

(22) Filed: Apr. 17, 2023

(65) Prior Publication Data
US 2024/0348618 A1 Oct. 17, 2024

(51) Int. Cl.
| | |
|---|---|
| H04L 9/40 | (2022.01) |
| G06F 21/62 | (2013.01) |
| G06T 7/00 | (2017.01) |
| G06T 11/00 | (2006.01) |

(52) U.S. Cl.
CPC ........ *H04L 63/102* (2013.01); *G06F 21/6218* (2013.01); *G06T 7/0002* (2013.01); *G06T 11/00* (2013.01); *H04L 63/08* (2013.01)

(58) Field of Classification Search
None
See application file for complete search history.

(56) References Cited

U.S. PATENT DOCUMENTS

| | | |
|---|---|---|
| 8,144,399 B2 | 3/2012 | Steenblik et al. |
| 8,194,646 B2 | 6/2012 | Elliott et al. |
| 8,316,237 B1 | 11/2012 | Felsher et al. |
| 8,832,778 B2 | 9/2014 | McCune et al. |
| 8,918,865 B2 | 12/2014 | Freericks et al. |
| 9,148,419 B2 | 9/2015 | D'Souza et al. |
| 9,177,153 B1 | 11/2015 | Perrig et al. |

(Continued)

OTHER PUBLICATIONS

Wazir, W., Khattak, H.A., Almogren, A., Khan, M.A. and Din, I.U., 2020. Doodle-based authentication technique using augmented reality. IEEE Access, 8, pp. 4022-4034. (Year: 2020).*

(Continued)

*Primary Examiner* — Luu T Pham
*Assistant Examiner* — Edward X Long

(57) ABSTRACT

An apparatus may comprise a memory communicatively coupled to a processor. The memory may be configured to store a plurality of rendering commands to render one or more simulated objects in a simulated environment. The processor may be configured to render a simulated object of the one or more simulated objects in the simulated environment based at least in part upon a rendering command of the plurality of rendering commands; display the simulated environment comprising the simulated object; retrieve, from the registry, a baseline rendering command to render a baseline version of the simulated object; and perform a hyperspectral imaging analysis of the simulated object in the simulated environment. Further, the processor may be configured to determine whether the simulated object is tampered or untampered based at least in part upon a result of the hyperspectral imaging analysis indicating whether the simulated object is different from the baseline version.

20 Claims, 4 Drawing Sheets

(56) References Cited

U.S. PATENT DOCUMENTS

| | | |
|---|---|---|
| 9,503,470 B2 | 11/2016 | Gertner et al. |
| 9,536,113 B2 | 1/2017 | Isozaki et al. |
| 9,767,284 B2 | 9/2017 | Ghose |
| 11,117,055 B2 | 9/2021 | Haile et al. |
| 2007/0254631 A1 | 11/2007 | Spooner |
| 2018/0174122 A1 | 6/2018 | Mattingly et al. |
| 2019/0134513 A1 | 5/2019 | Vock et al. |
| 2019/0303541 A1 | 10/2019 | Reddy et al. |
| 2019/0305957 A1 | 10/2019 | Reddy et al. |
| 2019/0334722 A1 | 10/2019 | Arasu et al. |
| 2019/0371073 A1* | 12/2019 | Harviainen ............. G06F 3/012 |
| 2020/0160354 A1 | 5/2020 | Howard et al. |
| 2021/0200864 A1 | 7/2021 | Rudnik |
| 2022/0092450 A1 | 3/2022 | Donoho et al. |
| 2022/0156652 A1 | 5/2022 | Augustine et al. |
| 2022/0300591 A1* | 9/2022 | Kim ..................... G06V 10/774 |
| 2023/0214900 A1* | 7/2023 | Assouline .......... G06Q 30/0643 |
| | | 705/26.7 |

OTHER PUBLICATIONS

Stephenson, S., Pal, B., Fan, S., Fernandes, E., Zhao, Y. and Chatterjee, R., May 2022. Sok: Authentication in augmented and virtual reality. In 2022 IEEE symposium on security and privacy (SP) (pp. 267-284). IEEE. (Year: 2022).*

* cited by examiner

SYSTEM AND METHOD TO IDENTIFY AND REVERSE TAMPERING OF VIRTUAL IMAGES

TECHNICAL FIELD

The present disclosure relates generally to operation of a system configured to render simulated environments in a user device, and more specifically to a system and method to identify and reverse tampering of virtual images.

BACKGROUND

In a network environment, user devices are in data communication with other user devices that may be distributed anywhere in the world. These network environments allow data and information to be shared among these devices. Some of the technical challenges that occur when data is exchanged between devices are controlling data leakage, unauthorized access to data, and reducing the likelihood of malicious activities. Data storing user devices, such as computers, laptops, augmented reality devices, simulated reality devices, and smartphones, are vulnerable to attacks. This vulnerability poses several network security challenges. Existing systems are typically unable to detect a malicious attack until after the attack has occurred.

For example, in a simulated environment, a bad actor may tamper with a virtual image (e.g., a simulated object) to gain access to other users' information. In this example, the bad actor may modify the simulated object after the simulated object is rendered for the other users. Given that there are no solutions for identifying when simulated objects are tampered after rendering, the other users' information may be at risk when exploring the simulated environment.

SUMMARY OF THE DISCLOSURE

In one or more embodiments, a system and a method disclosed herein identify whether virtual images (e.g., image representations comprising simulated objects) are tampered after being rendered in a simulated environment. Specifically, the system and the method comprise at least one user device communicatively coupled to a network environment and configured to identify and reverse tampering of simulated objects. The user device may be in data communication with other user devices that may be distributed anywhere in the world. The user devices may allow data and information to be shared among one another. In some embodiments, the user devices may be data storing user devices, such as computers, laptops, augmented reality devices, simulated reality devices, smartphones, and the like. The system and the method may reduce or prevent network security challenges by reducing a possibility of malicious attacks caused via tampering of simulated objects in the simulated environment.

In one or more embodiments, the system and the method are configured to exchange a validation profile of a user with a registry located in a server. The validation profile may comprise multiple credentials associated with accessing the simulated environment. At the server, each credential of the multiple credentials is confirmed as belonging to a corresponding digital entity in the simulated environment. The server may compare the multiple credentials to a user profile to allow access to a corresponding digital entity of the user. In some embodiments, the corresponding digital entity is a simulated representation of the user (e.g., an avatar, placeholder, or the like) configured to interact with one or more simulated objects in the simulated environment. In the simulated environment, the corresponding digital entity may enable the user to perform one or more operations associated with the one or more simulated objects. For example, the corresponding digital entity may enable the user to open or close a simulated object representing a door in the simulated environment.

If the validation profile is confirmed to belong to the corresponding digital entity, the system and the method may be configured to render simulated objects in the simulated environment associated with the corresponding digital entity based at least in part upon one or more rendering commands over a time period. In some embodiments, the simulated objects may be specific to the corresponding digital entity. In this regard, the simulated objects may be rendered equally or differently for multiple users based at least upon their associated credentials and rendering commands. For example, for a user to access a corresponding digital entity in a simulated environment representing a specific event area (e.g., a basketball arena, a concert auditorium, and the like), the validation profile of the user may comprise credentials proving that the corresponding digital entity of the user may be located inside the event area. In this example, the event area may be rendered as the simulated environment and simulated objects surrounding the corresponding digital entity based on the rendering commands.

In one or more embodiments, the system and the method display the simulated environment to the user in a display. As simulated objects are rendered in a field of view shown in the display, the method and the system may retrieve multiple baseline rendering commands from the registry of the server. The baseline rendering commands may be used to render baseline versions of the simulated objects. In some embodiments, the system and the method perform hyperspectral image analyses of each simulated object in the simulated environment to identify whether the simulated objects are tampered after being rendered in a simulated environment.

A hyperspectral image analysis may comprise identifying multiple simulated spectral bands for each simulated object and retrieving multiple baseline spectral bands for the baseline versions of the simulated objects. For a given simulated object rendered in the field of view shown in the display, the hyperspectral image analysis may compare one or more properties of one or more simulated spectral bands to one or more properties of one or more baseline spectral bands. In this regard, the one or more properties of the first simulated spectral band may comprise a resolution property indicating a resolution of the simulated object, a frame rate property indicating a frame rate of the simulated object, and a reflectance property indicating a reflectance of the simulated object. Further, the one or more properties of the first baseline spectral band may comprise a resolution property indicating a resolution of the baseline version of the simulated object, a frame rate property indicating a frame rate of the baseline version of the simulated object, and a reflectance property indicating a reflectance of the baseline version of the simulated object. The hyperspectral image analysis may generate a result showing whether each simulated spectral band is equal to a corresponding baseline spectral band. The result may indicate that a given simulated object is tampered if any one simulated spectral band is different from a corresponding baseline spectral band. The result may indicate that a given simulated object is untampered if the simulated spectral bands are equal to corresponding baseline spectral bands.

In one or more embodiments, the system and the method determine that the simulated object is tampered or untampered based at least in part upon the result of the hyperspectral image analyses. In response to determining that a given simulated object is tampered, the system and the method may reverse the tampering by replacing the given simulated object with a corresponding baseline version of the given simulated object in the simulated environment. The system and the method may generate an alert indicating that the given object is tampered. The system and the method may display the alert as an overlay in the display showing the simulated environment. In response to determining that a given simulated object is untampered, the system and the method may identify the rendering command used to render the given simulated object as a validated rendering command to render an untampered version of the given simulated object in the simulated environment over a second time period. In this regard, the second time period may be different from the first time period and these time periods may not overlap as a result. The second time period may be subsequent to the first time period.

In one or more embodiments, the system and the method described herein are integrated into a practical application of reducing or preventing network security challenges by reducing a possibility of malicious attacks caused via tampering of simulated objects in the simulated environment. In this regard, the system and the method are integrated into a practical application of evaluating whether a simulated object is tampered over a time period lasting as long as the simulated object remains shown in a display. As a result, simulated objects shown in the display are periodically evaluated for tampering via the hyperspectral image analyses.

In some embodiments, the system and the method are integrated into a practical application of improving the chances that users' information remains secure from bad actors that may attempt to gain access via tampering of simulated objects in the simulated environment. In particular, the system and the method reduce cyber-attack risks associated with any interactions between simulated objects and a corresponding digital entity of a user in a simulated environment. As such, the system and method described herein are integrated into a practical application of protecting users' information when exploring the simulated environment. As a non-limiting example of technical solutions involving this practical application, the system and the method reduce the likelihood of malware attacks or eavesdropping attacks because the corresponding digital entity of a user is prevented from interacting with tampered simulated objects in the simulated environment.

In one or more embodiments, the system and method are directed to improvements in computer systems. Specifically, the system and the method reduce processor and memory usage in user devices by preventing device capability losses related to cyber-attacks. In particular, the system and the method eliminate processing times and memory usage associated with tracking interactions with simulated objects to determine whether a simulated object is tampered. Instead, the system and the method determine whether a simulated object is tampered or untampered and preventively allow the corresponding digital entity of a user to only interact with baseline versions of simulated objects (e.g., by definition being untampered versions) and simulated objects identified as untampered. Substantial processing capacity, memory usage, and power consumption is prevented by dynamically preventing interactions with tampered simulated objects as these interactions may otherwise cause bad actors from accessing network and personal resources associated with the user. Another technical solution involves eliminating potential great numbers of human work hours attempting to identify damages caused by cyber-attacks in networks associated with compromised user devices (e.g., user devices that exposed user information after interacting with tampered simulated objects).

In one or more embodiments, the system comprises an apparatus, such as a user device, that comprises a memory and a processor. The memory is configured to store a validation profile comprising a plurality of credentials associated with accessing a simulated environment; and a plurality of rendering commands to render one or more simulated objects in the simulated environment. The processor is communicatively coupled to the memory and configured to transmit the validation profile to a registry in which each credential of the plurality of credentials is confirmed as belonging to a corresponding digital entity in the simulated environment. The corresponding digital entity is configured to interact with the one or more simulated objects in the simulated environment. Further, the processor is configured to render a first simulated object of the one or more simulated objects in the simulated environment based at least in part upon a first rendering command of the plurality of rendering commands over a first time period; display the simulated environment comprising the first simulated object; retrieve, from the registry, a first baseline rendering command to render a first baseline version of the first simulated object; perform a first hyperspectral imaging analysis of the first simulated object in the simulated environment; and determine whether the first simulated object is tampered or untampered based at least in part upon a first result of the first hyperspectral imaging analysis indicating whether the first simulated object is different from the first baseline version. The first simulated object is tampered if the first result of the first hyperspectral imaging analysis indicates that the first simulated object is different from the first baseline version. The first simulated object is untampered if the first result of the first hyperspectral imaging analysis indicates that the first simulated object and the first baseline version are equal to one another. In addition, the processor is configured to in response to determining that the first simulated object is tampered, replace the first simulated object with the first baseline version in the simulated environment; and in response to determining that the first simulated object is untampered, identify the first rendering command as a validated rendering command to render an untampered version of the first simulated object in the simulated environment over a second time period.

In other embodiments, the method is performed by an apparatus, such as a user device that comprises a memory, a processor, and a display. The method comprises transmitting, by the processor, a validation profile to a registry in which each credential of a plurality of credentials is confirmed as belonging to a corresponding digital entity in a simulated environment. The validation profile comprises the plurality of credentials associated with accessing the simulated environment. The corresponding digital entity is configured to interact with one or more simulated objects in the simulated environment. The one or more simulated objects are rendered in the simulated environment at least in part upon a plurality of rendering commands to render. Further, the method comprises rendering, by the processor, a first simulated object of the one or more simulated objects in the simulated environment based at least in part upon a first rendering command of the plurality of rendering commands over a first time period; displaying, via a display, the simulated environment comprising the first simulated object; retrieving, from the registry, a first baseline rendering command to render a first baseline version of the first simulated object; performing, by the processor, a first hyperspectral imaging analysis of the first simulated object in the simulated environment; and determining, by the processor, whether the first simulated object is tampered or untampered based at least in part upon a first result of the first hyperspectral imaging analysis indicating whether the first simulated object is different from the first baseline version. The first simulated object is tampered if the first result of the first hyperspectral imaging analysis indicates that the first simulated object is different from the first baseline version. The first simulated object is untampered if the first result of the first hyperspectral imaging analysis indicates that the first simulated object and the first baseline version are equal to one another. In addition, in response to determining that the first simulated object is tampered, the method comprises replacing the first simulated object with the first baseline version in the simulated environment; and in response to determining that the first simulated object is untampered, the method comprises identifying the first rendering command as a validated rendering command to render an untampered version of the first simulated object in the simulated environment over a second time period.

In other embodiments, a non-transitory computer readable medium stores instructions that when executed by a processor cause the processor to transmit a validation profile to a registry in which each credential of a plurality of credentials is confirmed as belonging to a corresponding digital entity in a simulated environment. The validation profile comprises the plurality of credentials associated with accessing the simulated environment. The corresponding digital entity is configured to interact with one or more simulated objects in the simulated environment. The one or more simulated objects are rendered in the simulated environment at least in part upon a plurality of rendering commands to render. Further, the instructions cause the processor to render a first simulated object of the one or more simulated objects in the simulated environment based at least in part upon a first rendering command of the plurality of rendering commands over a first time period; display, via a display, the simulated environment comprising the first simulated object; retrieve, from the registry, a first baseline rendering command to render a first baseline version of the first simulated object; perform, by the processor, a first hyperspectral imaging analysis of the first simulated object in the simulated environment; and determine whether the first simulated object is tampered or untampered based at least in part upon a first result of the first hyperspectral imaging analysis indicating whether the first simulated object is different from the first baseline version. The first simulated object is tampered if the first result of the first hyperspectral imaging analysis indicates that the first simulated object is different from the first baseline version. The first simulated object is untampered if the first result of the first hyperspectral imaging analysis indicates that the first simulated object and the first baseline version are equal to one another. In addition, the instructions cause the processor to, in response to determining that the first simulated object is tampered, replace the first simulated object with the first baseline version in the simulated environment; and, in response to determining that the first simulated object is untampered, identifying the first rendering command as a validated rendering command to render an untampered version of the first simulated object in the simulated environment over a second time period.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
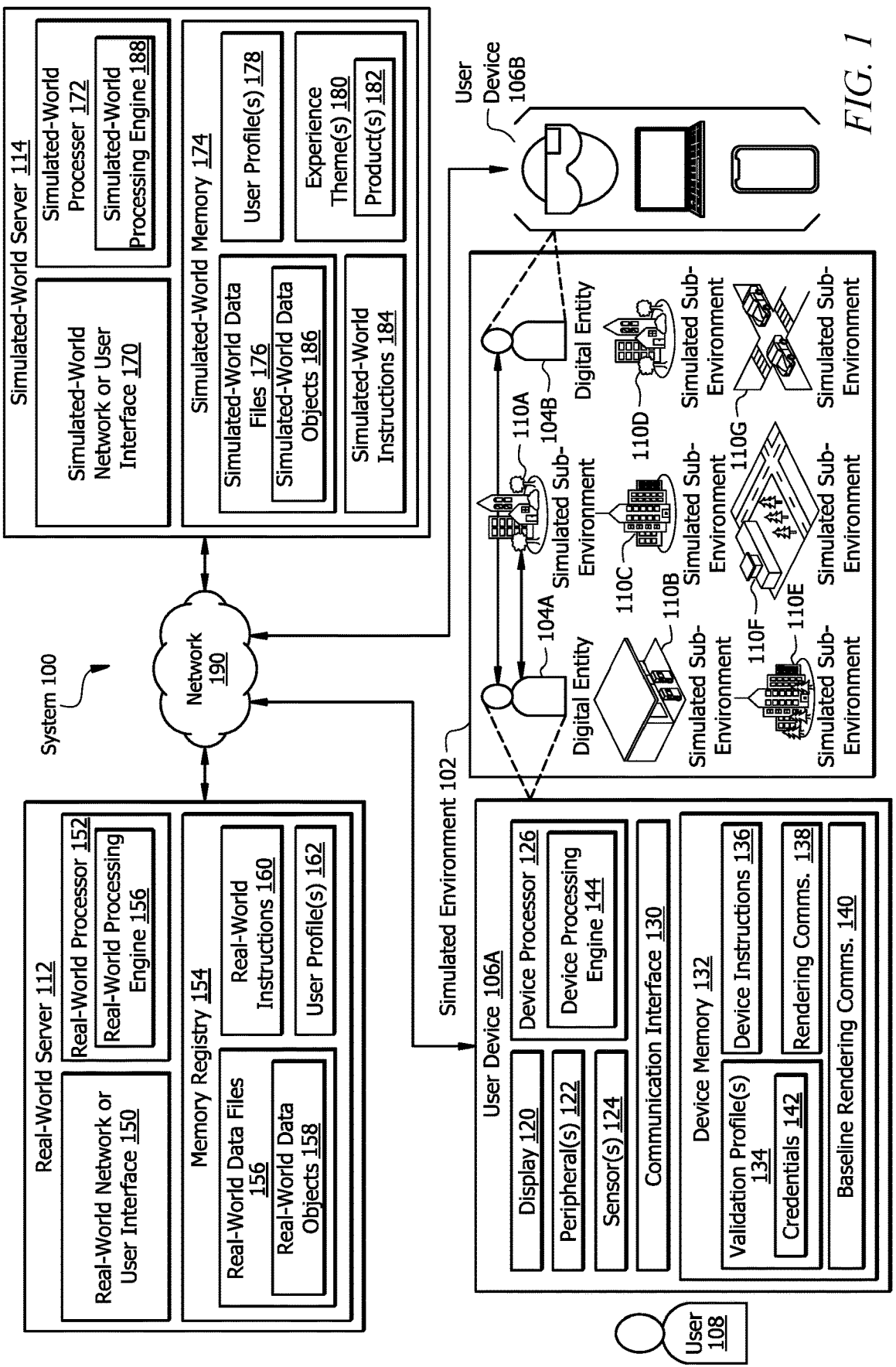
FIG. 1 illustrates a system in accordance with one or more embodiments.
Figure 2:
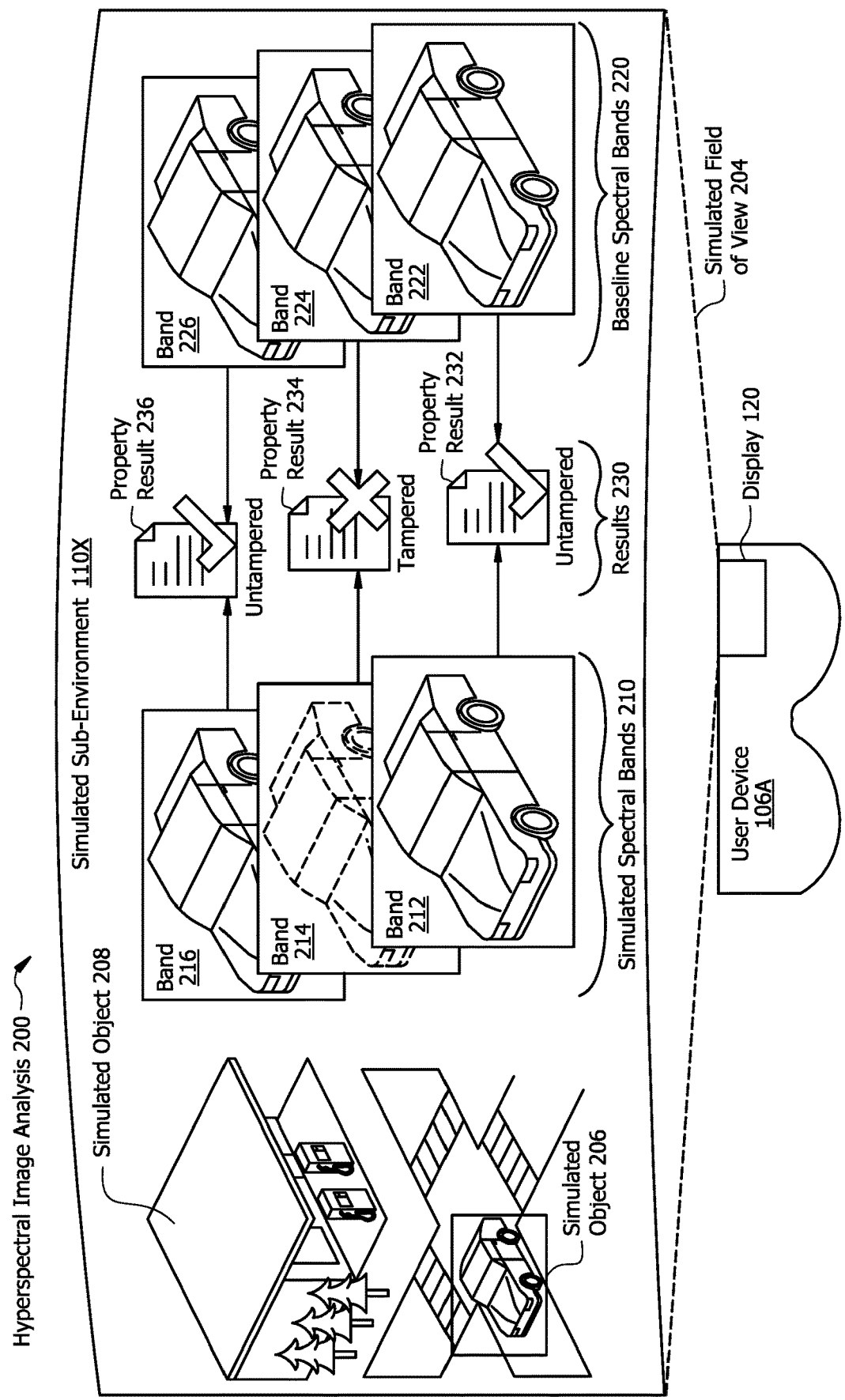
FIG. 2 illustrates an example perspective view of a user device in accordance with one or more embodiments.
Figure 3A:
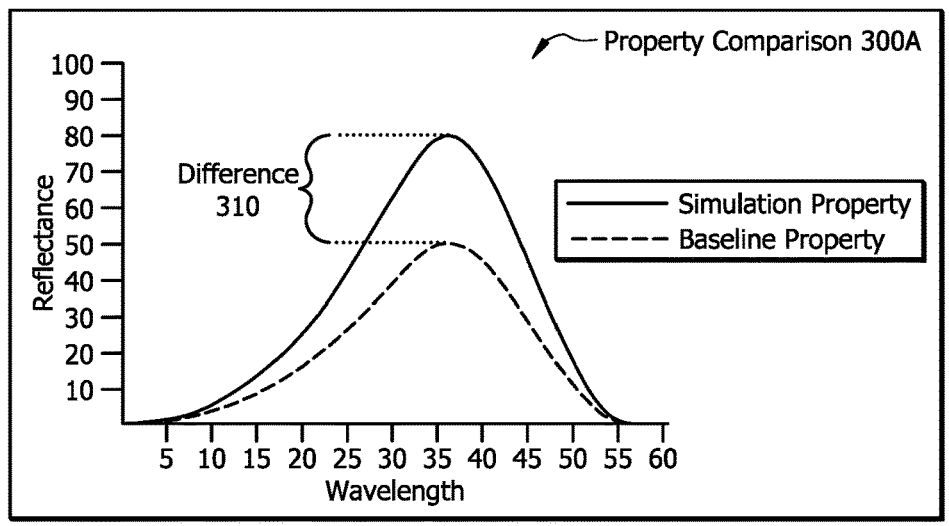
FIGS. 3A-3C illustrate examples of property comparisons in accordance with one or more embodiments.
Figure 3B:
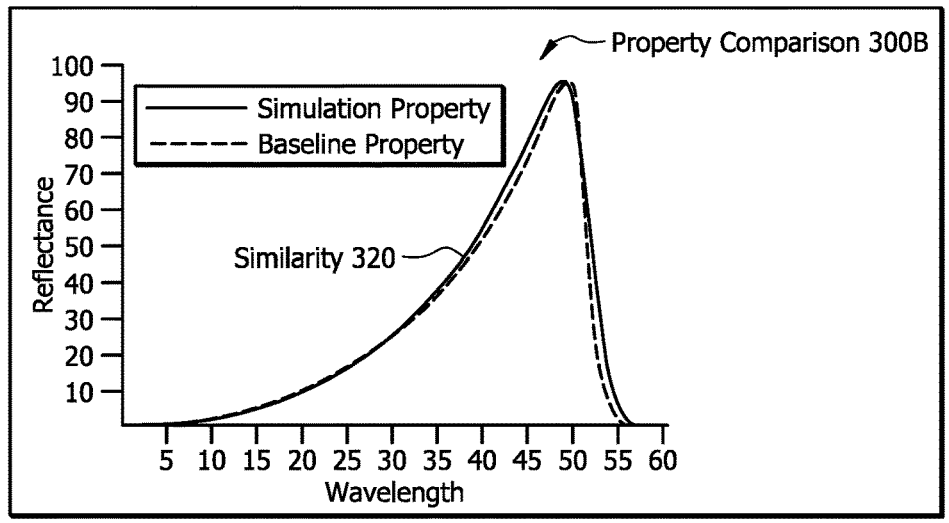
Figure 3C:
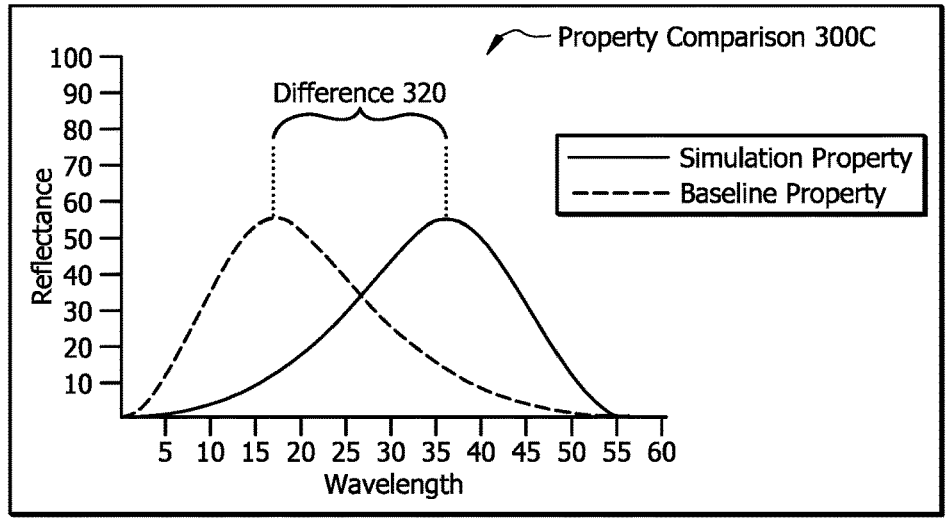
Figure 4:
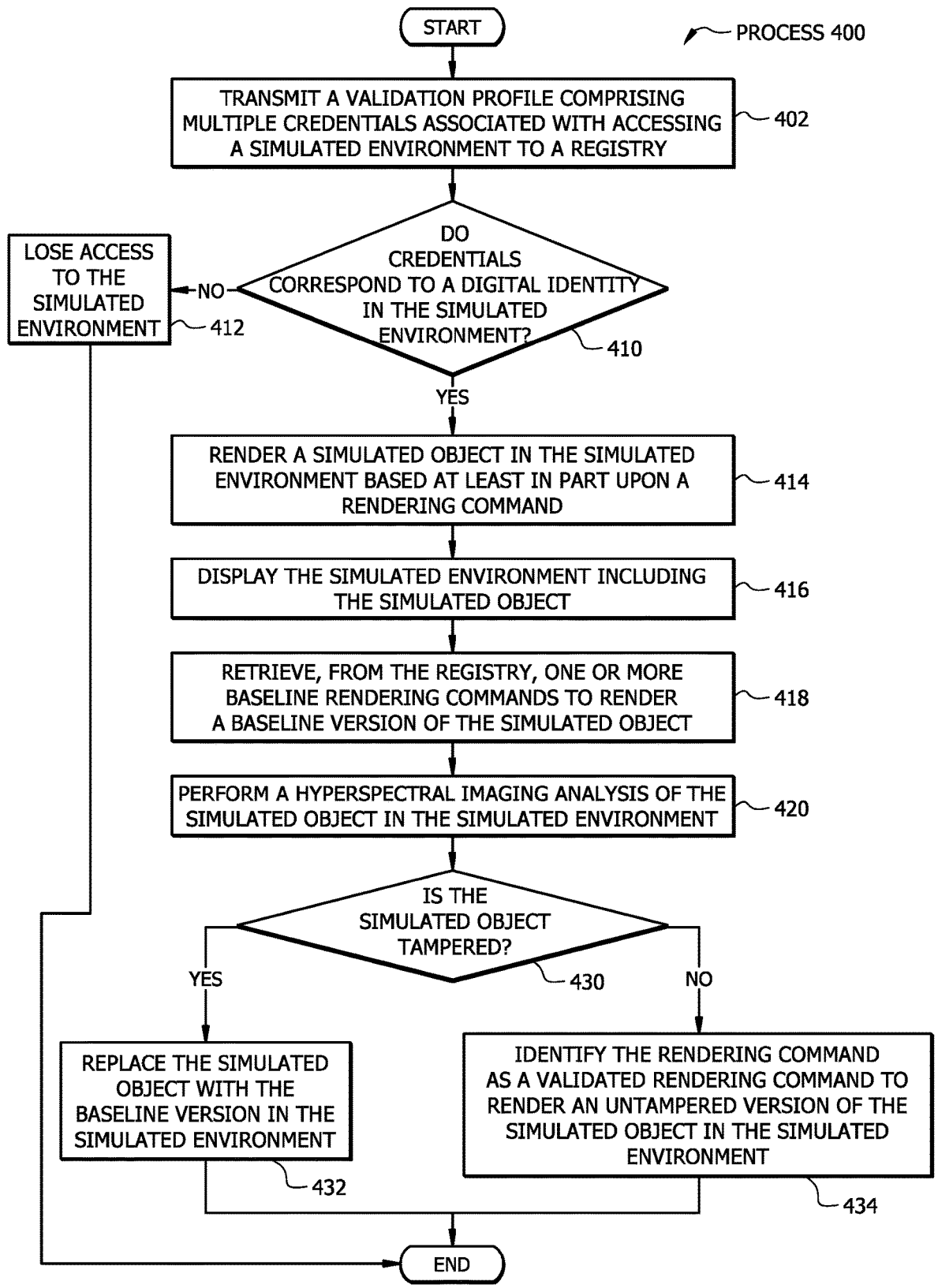
FIG. 4 illustrates an example flowchart of a method to identify and reverse tampering of virtual images in accordance with one or more embodiments.

As described above, previous technologies fail to provide solutions for identifying when simulated objects are tampered after being rendered in a simulated environment. In particular, this disclosure provides various systems and methods to identify and reverse tampering of virtual images (e.g., image representations comprising immersive or simulated objects) rendered in a virtual environment (e.g., a digitally-rendered immersive environment or a simulated environment). FIG. 1 illustrates an example system 100 in which simulated objects rendered in a simulated environment 102 are evaluated to be tampered or untampered. FIG. 2 illustrates an example perspective view of a simulated sub-environment 110X displayed in the user device 106A performing a hyperspectral image analysis 200 that identifies whether the simulated objects are tampered or untampered over a time period. FIGS. 3A-3C illustrate example property comparisons 300A-300C indicating similarities or differences between one or more properties of a simulated object and corresponding one or more properties of a baseline version of the simulated object. FIG. 4 illustrates a process 400 to perform one or more of operations described in reference to the system 100 of FIG. 1.

System Overview

FIG. 1 illustrates an example of a system 100 configured to accurately identify and reverse tampering of virtual images (e.g., image representations comprising simulated objects) rendered in a virtual environment (e.g., the simulated environment 102) over a time period, in accordance with one or more embodiments. The system 100 comprises a simulated environment 102 in which one or more digital entities may interact with multiple simulated objects. In the simulated environment 102 of FIG. 1, a digital entity 104A may be generated by a user device 106A associated with a user 108 and a digital entity 104B may be generated by a user device 106B. The user device 106A and the user device 106B may interact with one another, with one or more simulated sub-environments 110A-110G in the simulated environment 102, or with one or more simulated objects in any one of the simulated sub-environments 110A-110G. Further, the system 100 comprises a real-world server 112 and a simulated-world server 114 that contribute to the rendering of the simulated objects. In the system 100 of FIG. 1, the user device 106A, the user device 106B, the real-world server 112, and the simulated-world server 114 may be communicatively coupled via one or more connections via a network 180. The system 100 may be operable to transmit data, commands, and information among each one of the user device 106A, the user device 106B, the real-world server 112, and the simulated-world server 114 through the network 180.

In some embodiments, the simulated environment 102 may be a representation of an area or an environment including one or more rendered objects representing virtual reality (VR) or augmented reality (AR) properties to a user (e.g., the user 108) via a user device (e.g., user device 106B). In some embodiments, the VR or AR properties may comprise three-dimensional (3D) or enhanced two-dimensional (2D) images located at a perspective distance from the user (e.g., the user 108). Examples of the simulated environment 102 may be a metaverse environment, a VR-enhanced environment, an AG-enhanced environment, or the like. The simulated environment 102 may comprise a plurality of simulated sub-environments 110A-100G including one or more properties similar to those in the simulated environment 102. In the simulated environment 102 of FIG. 1, the digital entity 104A corresponding to the user device 106A and the digital entity 106B corresponding to the user device 106B may interact with one or more objects rendered in the simulated environment 102 and the simulated sub-environments 110A-110G.

In one or more embodiments, the system 100 may improve interoperability of real-world systems (e.g., comprising real-world server 112) and simulated-world systems (e.g., metaverse systems or comprising the simulated-world server 114) so that information may be seamlessly shared between these systems to implement data security, authorization of data interactions, access to virtual sub-environments (e.g., simulated sub-environments 110A-110G) and other data interactions performed in real-world and simulated environments. For example, user information collected from user-associated devices (e.g., user devices 106A, user device 106B, and the like) or assigned to users in a real-world environment may be used in the simulated environment 102 to authenticate the first user 110 before allowing the first user 110 to access the simulated environment 102 and perform any kind of action or interaction within the simulated environment 102. In some embodiments, the user information collected or assigned to user-associated devices (e.g., user devices 106A, user device 106B, and the like) in the real-world environment or the simulated environment 102 are used in the simulated environment 102 to provide the user-associated devices (e.g., user devices 106A, user device 106B, and the like) access to products or services within the simulated environment 102. In this regard, the system 100 provides improved information security by authenticating that digital entities (e.g., the digital entity 104A or digital entity 104B) are associated with one or more users (e.g., the user 108 for the digital entity 104A and not shown for digital entity 104B) operating corresponding user devices (e.g., user device 106A or user device 106B), not an unauthorized party, authorized to access the simulated environment 102, obtain products and services within the simulated environment 102, and perform data interactions associated with one or more of the simulated sub-environments 110A-110G. In the example of FIG. 1, the system 100 enables the digital entity 104A and the digital entity 104B to obtain a product or a service by transferring real-world data objects between real-world entities based on data interactions performed in the simulated environment 102.

In some embodiments, the system 100 may improve information security by improving the chances that users' information remains secure from bad actors that may attempt to gain access via tampering of simulated object in the simulated environment. In particular, the system 100 may reduce cyber-attack risks associated with any interactions between simulated objects and a corresponding digital entity (e.g., the digital entity 104A or digital entity 104B) of a user in the simulated environment 102. Further, the system 100 may be configured to protect users' information when exploring the simulated environment 102. In this regard, the system 100 may prevent malware attacks or eavesdropping attacks because the corresponding digital entity of a user is prevented from interacting with tampered simulated objects in the simulated environment 102.

In one or more embodiments, the terms "real-world" and "real-world environment" in this disclosure refer to any non-simulated environment or non-virtual environment where users (e.g., the user 108 for the digital entity 104A and not shown for digital entity 104B) physically interact with real persons and real objects. A real-world data interaction may refer to any data interaction performed outside the simulated environment 102 (e.g., a transferring an image from the user device 106A to the user device 106B via a connection unrelated to operations comprised in the simulated environment 102). Further, while certain embodiments of this disclosure may be described in the context of a metaverse environment as an example of the simulated environment 102, systems and methods discussed herein apply to any other simulated environment 102. In this regard, the terms "virtual environment" and "metaverse environment" are used interchangeably throughout this disclosure in reference to the simulated environment 102. In addition, while certain embodiments of this disclosure describe one or more operations in relation to the user device 106A and the user 108, these embodiments apply to any other user devices (e.g., user device 106B) or other users (not shown) connected to the network 116.

System Components

User Devices

In one or more embodiments, the user device 106A may comprise one or more users similar to user 108. Further, the user device 106B or any number of additional user devices (not shown) may access the simulated environment 102 at any given time and may comprise one or more electronic components similar to those shown in user device 106A. In some embodiments, the user device 106A, the user device 106B, and any additional user devices (not shown) may be computers, laptops, smartphones, AR devices, VR devices, or any electronic configured to display a representation of the simulated environment 102. As a non-limiting example, the user device 106A comprises a display 120, one or more peripherals 122, one or more sensors 124, a device processor 126, a communication interface 130, and a device memory 132. The device memory 132 comprises one or more validation profiles 134, device instructions 136, rendering commands 138, and baseline rendering commands 140. The one or more validation profiles 134 comprise multiple credentials 142. The device processor 126 comprises a device processing engine 144 that, when executing the device instructions 136, causes the device processor 126 to perform one or more operations. In one or more embodiments, the user devices (e.g., the user device 106A and the user device 106B) may be configured as shown, as described below, or in any other suitable configuration.

For example, the user device 106A may comprise one or more additional components or one or more shown components may be omitted.

In the example of FIG. 1, the user device 106A may access the simulated environment 102. The user device 106A may be configured to display a two-dimensional (2D) or three-dimensional (3D) representation of the simulated environment 102 in the display 120.

Examples of the simulated environment 102 may comprise, but are not limited to, a graphical or simulated representation of a metaverse, a map, a building interior, a landscape, a fictional location, an alternate reality, or any other suitable type of location or environment. The simulated environment 102 may be configured to use realistic or non-realistic physics for the motion of objects within the simulated environment 102. For example, some simulated environments 102 may be configured to use gravity whereas other simulated environments 102 may not be configured to use gravity. Within the simulated environment 102, each user may be associated with a digital entity (e.g., an avatar, a virtual representation, or a simulated representation such as the digital entity 104A associated with the user device 106A for the user 108 and the digital entity 104B associated with the user device 106B). The digital entities (e.g., the digital entity 104A and the digital entity 104B) may be graphical representations of users at a simulated location within the simulated environment 102. In some embodiments, the simulated location of the digital entities may be correlated to the physical location of corresponding users in the real-world environment. Examples of digital entities may comprise, but are not limited to, a person, an animal, or an object. In some embodiments, the features and characteristics of the digital entities may be customizable, and user-defined. For example, sizes, shapes, colors, accessories, or any other suitable type of appearance features associated with attires or appearance of users may be specified by the users. By using digital entities, users are able to move within the simulated environment 102 to interact with one or more additional digital entities and objects within the simulated environment 102 while independently remaining at a physical location in the real-world environment or being in movement or transit in the real-world environment.

While engaging in the simulated environment 102 via the digital entities, the user devices may interact with a plurality of other users, objects, or entities through a respective digital entity. For example, the user 108 operating the user device 106A may interact with one or more users operating the user device 106B via the digital entity 104A and the digital entity 104B, respectively. In another example, the digital entity 104A of the user device 106A may access a simulated sub-environment 110A within the simulated environment 102 and perform simulated-world data interactions within the simulated sub-environment 110A. In the real-world environment, the user 108 of the user device 106A may be physically located at a distance away from the user device 106B. The user 108 may access the simulated environment 102 through the user device 106A to control the digital entity 104A and attempt to engage in an interaction session with the user device 106B through the digital entity 104B.

Before the interaction between the digital entity 104A and the digital entity 104B occurs or the digital entity 104A may access the simulated sub-environment 110A, the simulated-world server 114 may authenticate that the digital entity 104A is associated with the user 108 and not an unauthorized third-party. For example, the one or more specific users may be required to sign into a secure portal that provides access to a data file (e.g., real-world data files 156 or simulated-world data files 176) associated with the user 108.

In one or more embodiments, each of the user devices (e.g., the user device 106A and the user device 106B) may be any computing device configured to communicate with other devices, such as a server (e.g., real-world server 112 or simulated-world server 114), databases, and the like through the network 116. Each of the user devices may be configured to perform specific functions described herein and interact with one or both of real-world server 112 and the simulated-world server 114 (e.g., via respective user interfaces). Each of the user devices may be hardware that is configured to provide hardware and software resources to one or more users. Examples of user devices comprise, but are not limited to, a simulated reality device, an augmented reality device, a laptop, a computer, a smartphone, a tablet, a smart device, an Internet-of-Things (IoT) device, or any other suitable type of device. The user devices may comprise one or more graphical user interfaces (GUIs) via an image generator display (e.g., the display 120), a touchscreen, a touchpad, multiple keys, multiple buttons, a mouse, or any other suitable type of hardware that allow users to view data and/or to provide inputs into the user devices. Each user device may be configured to allow users to send requests to one or both of real-world server 112 and the simulated-world server 114, or to another user device.

In some embodiments, the display 120 is configured to present visual information to the user 108 in the real-world environment. The display 120 may display images representing a VR environment, a simulated reality environment, an AR environment, or mixed reality environment. In other embodiments, the display 120 is configured to present visual information to the user 120 as the simulated environment 102 updated in real-time. The display 120 may be a wearable optical display (e.g., glasses or a head-mounted display (HMD)) configured to reflect projected images and enable the user 108 to see through the display 120. For example, the display 120 may comprise display units, one or more lenses, one or more semi-transparent mirrors embedded in an eye glass structure, a visor structure, or a helmet structure. Examples of display units comprise, but are not limited to, a cathode ray tube (CRT) display, a liquid crystal display (LCD), a liquid crystal on silicon (LCOS) display, a light emitting diode (LED) display, an organic LED (OLED) display, an active-matrix OLED (AMOLED) display, a projector display, or any other suitable type of display. In another embodiment, the display 120 is a graphical display on the user device 106A. For example, the graphical display may be a tablet display or a smartphone display configured to display the simulated environment 102.

In one or more embodiments, the one or more peripherals 122 may comprise audio devices (e.g., speaker, microphones, and the like), input devices (e.g., keyboard, mouse, and the like), or any suitable electronic component that may provide a modifying or triggering input to the user device 106A. For example, the one or more peripherals 122 may be speakers configured to release audio signals (e.g., voice signals or commands) during media playback operations. In another example, the one or more peripherals 122 may be microphones configured to capture audio signals from the user 108. In one or more embodiments, the one or more peripherals 122 may be configured to operate continuously, at predetermined time periods or intervals, or on-demand.

In one or more embodiments, the one or more sensors 124 may comprise multiple internal sensors (e.g., sensors sensing in an inside of the user device 106A) and multiple external sensors (e.g., sensors sensing in an outside of the user device 106A). The one or more sensors 124 may be hardware configured to react to one or more physical stimuli, determine an analog input associated to the stimuli, and provide the device processor 126 with a digital value representative of the analog input. In this regard, the one or more sensors may comprise one or more analog-to-digital converter (ADC) configured to record analog inputs of the physical stimuli and convert the recorded analog inputs into a digital format equivalent value over time. In some embodiments, the internal sensors sample stimuli from inside the user device 106A. For example, the internal sensors may be configured to sense stimuli that may be used to determine an orientation (e.g., a gyroscope), or a velocity (e.g., an accelerometer, the gyroscope, and the like). In some embodiments, the external sensors sample stimuli from outside the user device 106A. For example, the external sensors may be configured to sense stimuli that may be used to determine a geolocation (e.g., a geospatial positioning (GPS) sensor), images surrounding the user device 106A (e.g., image sensors or cameras), a distance of objects surrounding the user device 106A (e.g., depth sensors), or biometrics associated with the user 108 (e.g., biometrics sensors.

As a non-limiting example, the one or more sensors 124 may comprise at least one image sensor or camera. Examples of the one or more cameras may comprise charge-coupled device (CCD) cameras and complementary metal-oxide semiconductor (CMOS) cameras. The image sensors or cameras may be configured to capture images of the user 108. The image sensors or cameras may be configured to capture images continuously, at predetermined time periods or intervals, or on-demand. For example, the image sensors or cameras may be configured to receive a command from the user 108 to capture an image. In another example, the image sensors or cameras may be configured to capture images to from a video stream.

As a non-limiting example, the one or more sensors 124 may comprise a GPS sensor configured to capture and provide geographical location information associated with the user device 106A in relation with a reference point (e.g., a location on Earth). For example, the GPS sensor may be configured to provide a geographic location of the user 108. The GPS sensor may be configured to provide the geographic location information as a relative geographic location or an absolute geographic location. The GPS sensor may provide the geographic location information using geographic coordinates (i.e., longitude and latitude) or any other suitable coordinate system.

As a non-limiting example, the one or more sensors 124 may comprise one or more biometric sensors. Examples of the one or more biometric sensors may comprise retina scanners, fingerprint scanners, and facial scanners. The one or more biometric sensors may be configured to capture information about a person's physical characteristics and output a biometric signal based on captured information. A biometric signal is a signal that is uniquely linked to a person based on their physical characteristics. For example, the one or more biometric sensors may be configured to perform a retinal scan of an eye of the user 108 and generate a biometric signal for the user 108 based on the retinal scan. In another example, one of the biometric sensors may be configured to perform a fingerprint scan of a finger of the user 108 and generate a biometric signal for the user 108 based on the fingerprint scan.

The device processor 126 comprises one or more processors operably coupled to and in signal communication with the display 120, the one or more peripherals 122, the one or more sensors 124, the communication interface 130, and the device memory 132 in the user device 106A. The device processor 126 may be configured to receive and transmit electrical signals among the display 120, the one or more peripherals 122, the one or more sensors 124, the communication interface 130, and the device memory 132. The electrical signals may be used to send and receive data (e.g., images captured from the one or more sensors 124, render simulated objects to display on the display 120, and the like), control, or communicate with servers and other user devices. The device processor 126 may be operably coupled to one or more other electronic components (e.g., the real-world server 112 or the simulated-world server 114 shown in FIG. 1).

In one or more embodiments, the service processor 126 is any electronic circuitry comprising state machines, one or more central processing unit (CPU) chips, logic units, cores (e.g., a multi-core processor), field-programmable gate array (FPGAs), application specific integrated circuits (ASICs), or digital signal processors (DSPs). The service processor 126 may be a programmable logic device, a microcontroller, a microprocessor, or any suitable combination of the preceding. The one or more processors may be configured to process data and implemented in hardware or software. For example, the service processor 126 may comprise an 8-bit, a 16-bit, a 32-bit, a 64-bit, or of any other suitable architecture. The processor 202 may comprise an arithmetic logic unit (ALU) that performs arithmetic and logic operations, processor registers that supply operands to the ALU and store the results of ALU operations, and a control unit that fetches instructions from memory/storage and executes them by directing the coordinated operations of the ALU, registers and other components.

The service processor 126 may comprise a device processing engine 144 that may be hardware configured to execute various instructions (e.g., the device instructions 136 in the device memory 132). For example, the processing engine 144 may be configured to execute one or more instructions of the device instructions 136 that implement one or more operations described herein, such as some or all of those described with respect to FIGS. 1-4. For example, the service processor 126 may be configured to display simulated objects on the display 120, detect hand gestures, identify simulated objects selected by a detected hand gesture, capture biometric information of the user 108 as described above, and communicate via the communication interface 130 with the real-world server 112, the simulated-world server 114, or the user device 106B. In some embodiments, the operations described herein are implemented using logic units, FPGAs, ASICs, DSPs, or any other suitable hardware or electronic circuitry as described above.

In one or more embodiments, the communication interface 130 is a user interface or a network interface configured to enable wired and/or wireless communications between the user device 106A and one or more electronic components (e.g., the user device 106B, the real-world server 112, the simulated-world server 114) via the network 116. For example, the communication interface 130 is configured to enable the device processor 126 to transmit and receive signals with these electronic components. The communication interface 130 may be configured to communicate data between the user device 106A and other network devices, systems, or domain(s). For example, the communication interface 130 may comprise a WIFI interface, a Bluetooth interface, a ZigBee interface, an RFID interface, a near field communication interface, a local area network (LAN) interface, a wide area network (WAN) interface, a modem, a switch, or a router. Further, the communication interface 130 is configured to facilitate the device processor 126 in communicating with other electronic components. In some embodiments, the device processor 126 may be configured to send and receive data using the communication interface 130. The communication interface 130 may be configured to use any suitable type of communication protocol to configure, operate, and control transmission and reception of information via the communication interface 130.

In one or more embodiments, the device memory 132 may be configured to store any of the information described with respect to FIGS. 1-4 along with any other data, instructions, logic, rules, or code operable to perform the operations described herein when executed by the device processor 126. For example, the device memory 132 may store the device instructions 136. The device memory 132 comprises one or more disks, tape drives, or solid-state drives, and may be used as an over-flow data storage device, to store programs when such programs are selected for execution, and to store instructions and data that are read during program execution. The device memory 132 may be operable to store, for example, information relating to the identity of the user 108 (e.g., one or more validation profiles 134), one or more device instructions 136 for performing the functions of the user device 106A described herein, one or more rendering commands 138 for rendering simulated objects in the simulated environment 102, one or more baseline rendering commands 140 for rendering baseline versions of the simulated objects in the simulated environment 102, and any other data or instructions. The device memory 132 may be volatile or non-volatile and may comprise read-only memory (ROM), random-access memory (RAM), ternary content-addressable memory (TCAM), dynamic random-access memory (DRAM), and static random-access memory (SRAM).

In one or more embodiments, the validation profiles 134 are profiles comprising user-associated information. The validation profiles 134 may include one or more user credentials 142 indicating one or more access requests to the simulated environment 102, one or more simulated sub-environments 110A-110G, or multiple operations in the simulated environment 102. The validation profiles 134 may include user-specific access commands or tokens such as usernames with corresponding passwords, passcodes, passphrases, pins, or any string of data that may be confirmed to access the simulation environment 102 or one or more of the simulated sub-environments 110A-110G. In some embodiments, the user credentials 142 indicate information that may be confirmed by the real-world server 112 or the simulated-world server 114 to access the digital entity 104A. For example, a validation profile of the one or more validation profiles 134 may provide one or more credentials 142 to access the digital entity 104A at a predetermined simulated location in the simulated environment 102 (e.g., the simulated sub-environments 110A-110G).

In one or more embodiments, the simulated sub-environments 110A-110 may be a designated region within the simulated environment 102 for use by a given user (e.g., the user 108 for the user device 106A or one or more users for the user device 106B), an entity, or an organization. For example, a simulated sub environment 110B may be assigned to a particular entity which may provide one or more services to users of the simulated environment 102. The simulated sub-environment 110B may take any form in the simulated environment 102 including, but not limited to, a simulated room, a simulated building or portions thereof, a simulated store, or any other designated simulated space/region within the simulated environment 102. The simulated-world server 114 may be configured to generate simulated sub-environments 110A-110G with the simulated environment 102. The simulated sub-environments 110A-110G may be generated for a customized purpose. For example, a simulated sub-environment 110C may be used by an entity that is assigned the simulated sub-environment 110C for receiving simulated-world data objects 186 from users for storing in the simulated-world data files 176 or for distribution to specified one or more target entities. In another example, a simulated sub-environment 110D may allow users (e.g., the user 108) of the simulated environment 102 to perform simulated-world data interactions including transferring simulated-world data objects 186 to other users (e.g., not shown user of the user device 106B) and/or one or more target entities.

In one or more embodiments, the simulated-world server 114 may be configured to generate customized simulated sub-environments 110E-110G to provide customized simulated experiences to users that meet a predetermined criteria or include specific credentials 142 in their corresponding validation profiles 134. For example, the simulated-world server 114 may be configured to generate the simulated sub-environment 110E as a simulated educational location in which the user 108 may interact with digital entities of students and professors attending lectures or lessons and simulated objects representing books, desks, whiteboards, and the like. In another example, the simulated-world server 114 may be configured to generate the simulated sub-environment 110F as a simulated concert venue outdoor location in which the user 108 may interact with digital entities of other concert goers and simulated objects representing seats, access lines, and the like. In yet another example, the simulated-world server 114 may be configured to generate the simulated sub-environment 110F as a simulated road or track in which the user 108 may interact with digital entities of other users driving or observing the drivers and simulated objects representing motor vehicles, control dashboards, street signs, and the like.

In one or more embodiments, the rendering commands 138 are one or more commands associated with an appearance of an object. The rendering commands 138 may be a basis for rendering a simulated version of the object in the simulated environment 102. The rendering commands 138 may be stored in the device memory 132 in association with a specific access to the simulated environment 102. The rendering commands 138 may be basis to render one or more simulated objects within the specific access in the simulated environment 102. For example, one or more credentials 142 to access the simulated sub-environment 110A as the digital entity 104A may include rendering commands 138 to render the digital entity 104A and any immediate surrounding simulated objects. If the simulated sub-environment 110A were to be a sports event or a sports arena, the rendering commands 138 may render the digital entity 104A at a preestablished location (e.g., a seat in the arena), additional seats surrounding the digital entity 104A, a basketball court, a scoreboard, and the like. In one or more embodiments, the rendering commands 138 are obtained from the real-world server 112 or the simulated-world server 114 upon the one or more credentials are confirmed to access the simulated sub-environment 110A. The rendering commands 138 may be bases to render one or more simulated objects in the simulated environment 102 over a time period. The time period may be a time in which a simulated object is rendered and refreshed (e.g., updated). In some embodiments, the time period may be a dynamically changing time period or a predetermined time period in accordance with one or more operations associated with the simulated sub-environment 110A in the simulated environment 102. In one or more embodiments, the baseline rendering commands 140 are one or more commands associated with an appearance of an object that is proven to be a baseline version of the simulated object. The baseline rendering commands 140 may be a basis for rendering a baseline version of the simulated object in the simulated environment 102. The baseline rendering commands 140 may be stored in the device memory 132 in association with a specific access to the simulated environment 102. The baseline rendering commands 140 may be basis to render versions of one or more simulated objects within the specific access in the simulated environment 102. For example, the baseline rendering commands 140 may be used to render baseline versions of any immediate surrounding simulated objects. If the simulated sub-environment 110A were to be a sports event or a sports arena, the baseline rendering commands 140 may render additional seats surrounding the digital entity 104A, the basketball court, the scoreboard, and the like. In one or more embodiments, the baseline rendering commands 140 are obtained from the real-world server 112 or the simulated-world server 114 upon the one or more credentials are confirmed to access the simulated sub-environment 110A. The baseline rendering commands 140 may be bases to render baseline versions of the one or more simulated objects in the simulated environment 102 over the time period. As described above, the time period may be a time in which a simulated object is rendered and before the simulated object is refreshed (e.g., updated). In some embodiments, the time period may be a dynamically changing time period or a predetermined time period in accordance with one or more operations associated with the simulated sub-environment 110A in the simulated environment 102.

In one or more embodiments, the device processor 126 may be configured to retrieve the rendering commands 138 and the baseline rendering commands 140 from the real-world server 112 and the simulated-world server 114. The device processor 126 may retrieve the rendering commands 138 once and the baseline rendering commands 140 periodically to maintain baseline rendering commands 140 for a current state of a user interface in the simulated environment 102. In some embodiments, the device processor 126 may be configured to render any simulated objects in the simulated environment 102 over the time period using a specific rendering command of the rendering commands 138, evaluate the rendered simulated objects for tampering, and replace any tampered objects with new simulated objects rendered based at least in part upon a corresponding baseline rendering command of the baseline rendering commands 140. As it will be described in detail in reference to FIG. 2, the device processor 126 may be configured to evaluate whether any of the simulated objects in the simulated environment 102 are tampered or untampered via hyperspectral image analyses. In some embodiments, in response to determining that a specific simulated object is untampered, the device processor 126 may identify a rendering command of the rendering commands 138 used as a basis to render the specific simulated object as a validated rendering command to render an untampered version of the specific simulated object in the simulated environment over a new time period (e.g., a subsequent time period following the time period in which the specific simulated object is first rendered). In other embodiments, in response to determining that the specific simulated object is tampered, the device processor 126 may replace the specific simulated object with a corresponding baseline version of the simulated object rendered using a baseline rendering command of the baseline rendering commands 140 in the simulated environment 102. In one or more embodiments, the simulated objects may be evaluated for tampering as soon as a given simulated object is shown in the display 120 of the user device 106A, as soon as eyes of the user 108 focus on the given simulated object (e.g., detected via eye-tracking), or as soon as the given simulated object is rendered in the simulated environment 102.

Servers

In one or more embodiments, the system 100 comprises a real-world server 112 having a physical location in the real world. The real-world server 112 comprises a real-world network or user interface 150, a real-world processor 152, and a memory registry 154. The memory registry 154 comprises real-world data files 156, real-world instructions 160, and one or more real-world user profiles 162. The real-world data files 156 comprises real-world data objects 158. The real-world processor 152 comprises a device processing engine 144 that, when executing the real-world instructions 160, causes the real-world processor 152 to perform one or more operations.

In some embodiments, the real-world processor 152 comprises one or more processors operably coupled to and in signal communication with the memory registry 154. The real-world processor 152 may be any electronic circuitry including, but not limited to, state machines, one or more CPU chips, logic units, cores (e.g., a multi-core processor), FPGAs, ASICs, or DSPs. The real-world processor 152 may be a programmable logic device, a microcontroller, a microprocessor, or any suitable combination of the preceding. The one or more processors may be configured to process data implemented in hardware or software. For example, the real-world processor 152 may comprise an 8-bit, a 16-bit, a 32-bit, a 64-bit, or of any other suitable architecture. The real-world processor 152 may include an ALU for performing arithmetic and logic operations, processor registers that supply operands to the ALU and store the results of ALU operations, and a control unit that fetches instructions from memory and executes them by directing the coordinated operations of the ALU, registers, and other components.

In the real-world processor 152, one or more processors may be configured to implement or execute the real-world instructions 160. For example, the one or more processors may be configured to execute the real-world instructions 160 to implement one or more operations associated with the real-world server 112. In this regard, the real-world processor 152 may be a special-purpose computer designed to implement the operations described in reference to FIGS. 1-4. In one or more embodiments, the real-world server 112 is implemented using logic units, FPGAs, ASICs, DSPs, or any other suitable hardware. The real-world server 112 is configured to operate as described with reference to FIGS. 1-4. For example, the real-world processor 152 may be configured to perform at least a portion of the process 400 described in reference to FIG. 4.

In one or more embodiments, the real-world network or user interface 150 is configured to enable wired and/or wireless communications. The real-world network or user interface 150 may be configured to communicate data between the real-world server 112 and other devices, systems, or domains (e.g., the user device 106A, the user-device 106B, and the simulated-world server 114). For example, the real-world network or user interface 150 may comprise a Wi-Fi interface, a LAN interface, a WAN interface, a modem, a switch, or a router. The real-world processor 152 may be configured to use any suitable type of communication protocol to send and receive data using the real-world network or user interface 150.

The memory registry 154 comprises one or more disks, tape drives, or solid-state drives, and may be used as an over-flow data storage device, to store programs when such programs are selected for execution, and to store instructions and data that are read during program execution. The memory registry 154 may be volatile or non-volatile and may comprise a ROM, a RAM, a TCAM, a DRAM, and a SRAM. The memory registry 154 is operable to store information relating to the real-world data files 156, the real-world data objects 158, the real-world server instructions 160, and the real-world user profiles 162. The real-world server instructions 160 may include any suitable set of instructions, logic, rules, or code operable to execute operations by the real-world server 112.

In one or more embodiments, the system 100 comprises a simulated-world server 114 having a simulated location in the simulated environment 102. The simulated-world server 114 comprises a simulated-world network or user interface 170, a simulated-world processor 172, and a simulated-world memory 174. The simulated-world memory 174 comprises simulated-world data files 176, one or more simulated-world user profiles 178, one or more experience themes 180 offering one or more products 182, and simulated-world instructions 184. The simulated-world data files 176 comprise simulated-world data objects 186. The simulated-world processor 172 comprises a simulated-world processing engine 188 that, when executing the simulated-world instructions 184, causes the simulated-world processor 172 to perform one or more operations.

In some embodiments, the simulated-world processor 172 comprises one or more processors operably coupled to and in signal communication with the simulated-world memory 174. The simulated-world processor 172 may be any electronic circuitry including, but not limited to, state machines, one or more CPU chips, logic units, cores (e.g., a multi-core processor), FPGAs, ASICs, or DSPs. The simulated-world processor 172 may be a programmable logic device, a microcontroller, a microprocessor, or any suitable combination of the preceding. The one or more processors may be configured to process data implemented in hardware or software. For example, the simulated-world processor 172 may comprise an 8-bit, a 16-bit, a 32-bit, a 64-bit, or of any other suitable architecture. The simulated-world processor 172 may include an ALU for performing arithmetic and logic operations, processor registers that supply operands to the ALU and store the results of ALU operations, and a control unit that fetches instructions from memory and executes them by directing the coordinated operations of the ALU, registers, and other components.

In the simulated-world processor 172, one or more processors may be configured to implement or execute the simulated-world instructions 184. For example, the one or more processors may be configured to execute the simulated-world instructions 184 to implement one or more operations associated with the simulated-world server 114. In this regard, the real-world processor 152 may be a special-purpose computer designed to implement the operations described in reference to FIGS. 1-4. In one or more embodiments, the simulated-world server 114 is implemented using logic units, FPGAs, ASICs, DSPs, or any other suitable hardware. The simulated-world server 114 is configured to operate as described with reference to FIGS. 1-4.

For example, the simulated-world processor 172 may be configured to perform at least a portion of the process 400 described in reference to FIG. 4.

In one or more embodiments, the simulated-world network or user interface 170 is configured to enable wired and/or wireless communications. The simulated-world network or user interface 170 may be configured to communicate data between the simulated-world server 114 and other devices, systems, or domains (e.g., the user device 106A, the user-device 106B, and the real-world server 112). For example, the simulated-world network or user interface 170 may comprise a Wi-Fi interface, a LAN interface, a WAN interface, a modem, a switch, or a router. The simulated-world processor 172 may be configured to use any suitable type of communication protocol to send and receive data using the simulated-world network or user interface 170.

The simulated-world memory 174 comprises one or more disks, tape drives, or solid-state drives, and may be used as an over-flow data storage device, to store programs when such programs are selected for execution, and to store instructions and data that are read during program execution. The simulated-world memory 174 may be volatile or non-volatile and may comprise a ROM, a RAM, a TCAM, a DRAM, and a SRAM. The simulated-world memory 174 is operable to store information relating to the simulated-world data files 176, the simulated-world data objects 186, the simulated-world instructions 184, the simulated-world user profiles 178, the one or more experience themes 180, and the one or more products 182. The simulated-world server instructions 184 may include any suitable set of instructions, logic, rules, or code operable to execute operations by the simulated-world server 114.

In one or more embodiments, the simulated-world server 114 may be configured to facilitate a user (e.g., the user 108) to obtain one or more products 182 in the simulated environment 102 or the real-world environment. As shown in FIG. 1, the simulated-world server 114 may be configured to store one or more experience themes 180, where each experience theme 180 relates to a particular type of experience that may be experienced by the user 108 in the simulated environment 102 or the real-world environment. An example of the experience themes 180 associated with the simulated environment 102 may include visual elements that make up the simulated environment 102 (i.e., a concert going experience, a travel experience, and the like). Each of the one or more experience themes 180 comprises one or more product types with multiple products 182 that relate to a given experience theme. For example, an experience theme of the experience themes 180 may relate to a visual experience of the user 108 within the simulated environment 102. In this experience theme, multiple corresponding product types may comprise appearance modifications (e.g., changes to an avatar or attire related to the digital entity 104A), buildings, roads, objects, colors, or patterns. In another example, an experience theme of the experience themes 180 may relate to a travel experience in the real-world environment. In this experience theme, multiple corresponding product types may comprise real-world access to rental cars, bus rides, train passes, travel destination entertainment, hotel stays, restaurants, and excursions. Each of the experience themes 180 may comprise several products 182 associated with each product type. For example, when a specific experience theme of the experience themes 180 relates to a visual experience within the simulated environment 102, the "appearance modifications" product type may include several specific avatars that may be used by the digital entity 104A within the simulated environment 102.

The "buildings" product type may include multiple specific simulated buildings that may be used to generate the simulated environment 102. The "colors" and "patterns" product types may respectively comprise multiple colors or patterns that may be used to render specific simulated objects or portions of the simulated environment 102.

In one or more embodiments, once one of the products 182 are selected by the user 108, the simulated-world server 114 may be configured to determine one or more data files (e.g., real-world data files 156 or simulated-world data files 176) that may be used to obtain at least one of the products 182 selected by the user 108. In this context, the simulated-world server 114 may be configured to store information relating to multiple real-world data files 156 and simulated-world data files 176 that may be used by the user 108 to obtain one or more of the products 182 associated with one or more experience themes 180. A particular product of the products 182 may be obtained by the user 108 by transferring a predetermined amount of real-world data objects 158 from a real-world data file of the real-world data files 156 registered to the user 108 to another real-world data file of the real-world data files 156 registered to an entity that provides the particular product, or by transferring a predefined amount of simulated-world data objects 186 from a simulated-world data file of the simulated-world data files 176 registered to the user 108 to another simulated-world data file of the simulated-world data files 176 registered to an entity that provides the particular product.

In some embodiments, a single data file (e.g., one of the real-world data files 156 or simulated-world data files 176) may be used to obtain multiple products 182. In some embodiments, any one of multiple data files (e.g., one of the real-world data files 156 or simulated-world data files 176, or combinations thereof) may be used to obtain a same product of the products 182.

Each of the real-world server 112 and the simulated-world server 114 may be a suitable server (e.g., including a physical server or simulated server) operable to store data in a memory (e.g., memory registry 154 or simulated-world memory 174) or provide access to one or more applications or other services. One or both of the real-world server 112 and the simulated-world server 114 may be a backend server associated with a particular entity (e.g., an organization) that facilitates conducting data interactions between particular entities, between one or more users, or between a user and a particular entity. In other embodiments, one or both of the real-world server 112 and the simulated-world server 114 may be organized in a distributed manner, or by leveraging cloud computing technologies. The real-world server 112 may store information which is primarily used to support data interactions performed in the real-world environment. The simulated-world server 114 may store information which is primarily used to support data interactions performed in the simulated environment 102 (e.g., a metaverse data interactions performed in a metaverse environment). In one or more embodiments, the real-world server 112 and the simulated-world server 114 may be implemented by a single server.

As shown in FIG. 1, real-world data files 156 of the user 108 are stored and managed by the real-world server 112 and the simulated-world data files 176 of the user 108 is stored and managed by the simulated-world server 114. In one or more embodiments, the real-world server 112 may employ SSO, multifactor authentication, or any other suitable authentication scheme in order to allow the user 108 access to the real-world data files 156. Similarly, the simulated-world server 112 may employ single sign-on (SSO), multi-factor authentication, or any other suitable authentication scheme in order to allow the user 108 access to the simulated-world data files 176. The real-world data files 156 and the simulated-world data files 176 may comprise the real-world data objects 158 and the simulated-world data objects 186, respectively. The real-world data files 156 and the simulated-world data files 176 may be associated to or owned by the user 108. The real-world server 112 and the simulated-world server 114 may store other information related to the user 108 comprising user profile information, account information (e.g., including access to digital identity such as the digital entity 104A and the digital entity 104B and other details relating to the real-world data objects 158 and the simulated-world data objects 186), avatar information, digital assets (e.g., respective real-world data objects 158 and simulated-world data objects 186) information, or any other suitable type of information that is associated with a user within the real-world environment or the simulated environment 102.

Information relating to the simulated-world data file of the simulated-world data files 176 of the user 108 may be stored by the simulated-world server 114 as part of the simulated-world user profiles 178 of the user 108 stored at the simulated-world server 114. The information may comprise an identity of the simulated-world data file, an amount of the simulated-world data objects 186 stored in the simulated-world data files 176, a log of simulated-world data interactions conducted in the simulated environment 102 in relation to the simulated-world data files 176 and any other information relating to the simulated-world data files 176. As described below, the information relating to the simulated-world data files 176 of the user 108 may further include a benefit count associated with the simulated-world data files 176.

Network

In the example system 100 of FIG. 1, the user device 106A, the user device 106B, the real-world server 140, and the simulated-world server 160 are communicatively coupled to one another via wired or wireless connections in a network 112. The network 112 may facilitate communication within the system 100. This disclosure contemplates that the network 112 may be any suitable network operable to facilitate communication between the user device 106A, the user device 106B, the real-world server 112, and the simulated-world server 114. The network 112 may include any interconnecting system capable of transmitting audio, video, signals, data, messages, or any combination of the preceding. The network 112 may include all or a portion of a LAN, a WAN, an overlay network, a software-defined network (SDN), a virtual private network (VPN), a packet data network (e.g., the Internet), a mobile telephone network (e.g., cellular networks, such as 4G or 5G), a Plain Old Telephone (POT) network, a wireless data network (e.g., WiFi, WiGig, WiMax, and the like), a Long Term Evolution (LTE) network, a Universal Mobile Telecommunications System (UMTS) network, a peer-to-peer (P2P) network, a Bluetooth network, a Near Field Communication network, a Zigbee network, or any other suitable network, operable to facilitate communication between the components of the system 100. In other embodiments, the system 100 may not have all of these components or may comprise other elements instead of, or in addition to, those above.

Operational Flow Overview

In the example of FIG. 1, the user device 106A may be configured to identify whether simulated objects are tampered after being rendered in the simulated environment 104. Specifically, the user device 106A may be configured to evaluated simulated objects in the simulated environment 102 over a time period and determine whether the simulated objects are tampered or untampered. As described above, the time period may be a time from a time a given simulated object is rendered to a time the given simulated object is refreshed (e.g., updated). Further, a time period may be a time duration between a first time the given simulated object is refreshed to a second time the simulated object is refreshed. In some embodiments, if simulated objects are identified as being tampered, the user device 106A may replace these simulated objects with corresponding baseline versions rendered using baseline rendering commands 140. The baseline version of a simulated object is a version of the simulated object that is previously (e.g., at a time period before a current time period) determined to be untampered. In other embodiments, if simulated objects are identified as being untampered, the user device 106A may determine to maintain the rendered simulated object for a subsequent time period. Further, the user device 106A may determine that rendering commands 138 used to render the simulated object a first time, may be used in future renders of the same simulated object. In a non-limiting example in reference to the user 108, the process of evaluating simulated objects is performed in real-time seamlessly before the digital entity 104A interacts with any of the simulated objects. As a result, the user device 106A may reduce or prevent network security challenges by reducing a possibility of malicious attacks caused via tampering of simulated objects in the simulated environment 102.

In one or more embodiments, the user device 106A reduces or prevents network security challenges by reducing a possibility of malicious attacks caused via tampering of simulated objects in the simulated environment 102. In this regard, the user device 106A evaluates whether a simulated object is tampered over a time period lasting as long as the simulated object remains shown in the display 120. As a result, simulated objects shown in the display 120 are periodically evaluated for tampering via one or more hyperspectral image analyses described in reference to FIG. 2.

In some embodiments, the user device 106A improves the chances that users' information remains secure from any bad actors that may attempt to gain access via tampering of simulated objects in the simulated environment 102. In particular, the user device 106A may reduce all or some cyber-attack risks associated with any interactions between simulated objects and the digital entity 104A of the user 108 in the simulated environment 102. In this regard, the user device 106A protects users' information when exploring the simulated environment 102. For example, the user device 106A may prevent malware attacks or eavesdropping attacks because the digital entity 104A of the user 108 is prevented from interacting with tampered simulated objects in the simulated environment 102.

Validation of a User Profile

In one or more embodiments, the user device 106A is configured to exchange one of the validation profiles 134 of the user 108 with the memory registry 154 or the simulated-world memory 174. The validation profiles 134 may comprise multiple credentials 142 associated with accessing the simulated environment 104. At the real-world server 112 or the simulated-world server 114, each credential of the multiple credentials 142 provided is confirmed as belonging to the digital entity 104A in the simulated environment 102.

The real-world server 112 or the simulated-world server 114 may compare the multiple credentials 142 to a user profile (e.g., in the real-world user profiles 162 or the simulated-world user profiles 178, respectively) to allow access to the digital entity 104A.

In one or more embodiments, as the user 108 initially registers with the real-world server 112 in the real-world environment, the real-world server 112 may collect several pieces of information from the user 108 including information relating to the identity of the user 108 such as a username, legal name, government identification number, biometrics (e.g., fingerprints, retina scans, face ID, and the like), residence address, mailing address, phone numbers, assets owned by the user, and copies of government issued documents (e.g., drivers permit, state identity documents, government identity cards, and the like). This information may be stored by the real-world server 112 as part of the one or more real-world user profiles 162. In some embodiments, at least a portion of a validation profile of the validation profiles 134 relating to the user 108 collected in the real-world environment may be stored in the simulated-world server 114. Once the identity of the user 108 is confirmed and other information provided by the user 108 is verified to be correct, the real-world server 112 may generate a real-world data file for the user 108 to store real-world data objects 158 owned by the user 108. In one or more embodiments, the user 108 may engage in a real-world interactions with a service representative managing the real-world server 112 (e.g., physical interaction at an office location, over phone, voice chat, and the like) to provide such information that may be used to register the user 108 at the real-world server 112 and generate the real-world data files 156 of the user 108. In some embodiments, the user 108 may engage in real-world interactions by accessing a webpage provided and managed by one or more users via the real-world server 112. Once the user 108 initiates a registration process via the webpage, the real-world server 112 may instruct the user 108 through several operations in which the user 108 may be requested to provide information necessary to verify the identity of the user 108 and register the user 108 with the real-world server 112.

In one or more embodiments, the user 108 may additionally register with the simulated-world server 114. In some embodiments, when initially registering with the simulated-world server 114, the user 108 may provide to the simulated-world server 114 the credentials 142 (e.g., username and password) that provide the user 108 access to the real-world server 112. In other embodiments, a single web page or web portal may allow the user 108 to register with the real-world server 112 as well as the simulated-world server 114. The user 108 may register with the real-world server 112 as described above and generate reciprocal credentials that allow the user 108 access to the real-world server 112 and services provided by the real-world server 112. Once registered with the real-world server 112, the web portal may provide the user 108 an option to additionally register with the simulated-world server 114 which may allow the user 108 to perform data interactions in the simulated environment 102. Once registered with the simulated-world server 114, the user 108 may generate one or more simulated-world data files 176 in which the user 108 may store simulated-world data objects 162 owned by the user 108. In one or more embodiments, the simulated-world data files 176 of the user 108 are associated with the real-world data files 156 of the user 108. For example, the simulated-world data files 176 of the user 108 may be simulated images of the real-world data files 156, where the simulated-world data objects 186 correspond to the real-world data objects 158. In some embodiments, the simulated-world data files 176 are simulated representations of the real-world data files 156. In another example, the simulated-world data files 176 store a portion of the real-world data objects 158 in the form of simulated-world data objects 186. In another example, the real-world data objects 158 may be converted to simulated-world data objects 186. In this case, there may not be a one-to-one conversion between the real-world data objects 158 and the simulated-world data objects 186.

Access to Simulated Environments

In the simulated environment 102, the digital entity 104A may enable the user 108 to perform one or more operations associated with the one or more simulated objects. For example, the digital entity 104A may enable the user 108 to open or close a simulated object representing a door in the simulated environment. If the validation profiles 134 of the user 108 are confirmed to belong to the digital entity 104, the user device 106A may be configured to render simulated objects in the simulated environment 102 associated with the digital entity 104A based at least in part upon one or more rendering commands 138 over a time period. In some embodiments, the simulated objects may be specific to surroundings of the digital entity 104A. In this regard, the simulated objects may be rendered equally or differently for multiple users based at least upon their associated credentials 142 and rendering commands 138. For example, for the user 108 to access the digital entity 104A in the simulated environment 102 representing a specific event area (e.g., a basketball arena, a concert auditorium, and the like), the validation profiles 134 of the user 108 may comprise the credentials 142 proving that the digital entity 104A of the user 108 is allowed to be located inside the event area. In this example, the event area may be rendered as the simulated environment 102 or one or more simulated sub-environments 110A-110G and simulated objects surrounding the corresponding digital entity 104A based on the rendering commands 138.

In one or more embodiments, the user device 106A displays the simulated environment 102 to the user in the display 120. As simulated objects are rendered in a field of view shown in the display 120, the user device 106A may retrieve multiple baseline rendering commands 140 from the memory registry 154 of the real-world server 112 or the simulated-world memory 174 of the simulated-world server 114. The baseline rendering commands 140 may be used to render baseline versions of the simulated objects.

Evaluate Simulated Objects

In one or more embodiments, the user device 106A may perform hyperspectral image analyses of each simulated object in the simulated environment 102 to identify whether the simulated objects are tampered after being rendered in the simulated environment 102. In some embodiments, user device 106A periodically evaluates any simulated objects surrounding the digital entity 104A of the user 108 in the simulated embodiment 102. In this regard, the user device 106A may determine whether the simulated objects comprise tampered interfaces or connections. The hyperspectral image analyses may evaluate multiple spectral bands associated with each simulated object to confirm whether each simulated object is tampered or untampered. A positive result (e.g., properties match) across the multiple spectral bands of a given simulated object indicate that the given simulated object is untampered. A negative result (e.g., properties do not match) of any spectral band of the multiple spectral bands of the given simulated object indicate that the given simulated object is tampered. The hyperspectral image analyses will be described in more detail in reference to the hyperspectral image analysis 200 of FIG. 2.

In some embodiments, results of the hyperspectral image analyses enable the user device 106A to determine whether the simulated object is tampered or untampered. If a given simulated object is determined to be tampered, the user device 106A may replace the simulated object with a corresponding baseline version in the simulated environment 102. If a given simulated object is determined to be untampered, the user device 106A may identify the one or more rendering commands 138 used to render the given simulated object as a validated rendering command to render an untampered version of the given simulated object in the simulated environment 102 over a subsequent time period. In this regard, the subsequent time period may be different from a starting time period and these time periods may not overlap as a result. If a given simulated object is determined to be tampered, the user device 106A may reverse the tampering by replacing the given simulated object with a corresponding baseline version of the given simulated object in the simulated environment 102. The user device 106A may generate an alert indicating to the user 108 that the given object is tampered. The user device 106A may display the alert as an overlay in the display 120 showing the simulated environment 102.

Example Hyperspectral Image Analyses

FIG. 2 illustrates a hyperspectral image analysis 200, in accordance with one or more embodiments. In the example of FIG. 2, the hyperspectral image analysis 200 is shown as being performed in a perspective view of the user device 106A presented in the display 120. In other embodiments, the hyperspectral image analysis 200 may be performed by the user device 106A in the background and without presenting any operations of the analysis in the display 120. The user device 106A comprises a simulation field of view 204 in which the user 108 may view a simulated sub-environment 110X as part of the simulated environment 104. In the simulation field of view 204, the simulated sub-environment 110X may include one or more simulated objects (e.g., simulated object 206 and simulated object 208). For example, the simulated object 206 may include a motor vehicle and the simulated object 208 may include a gas station.

In one or more embodiments, the hyperspectral image analysis 200 comprises identifying multiple simulated spectral bands 210 for each simulated object and retrieving multiple baseline spectral bands 220 for the baseline versions of the simulated objects. For a given simulated object rendered in the simulated field of view 204 shown in the display 120, the hyperspectral image analysis 200 may compare one or more properties of one or more simulated spectral bands 210 to one or more corresponding properties of one or more baseline spectral bands 220. In some embodiments, the one or more properties of the simulated spectral bands 210 may comprise a resolution property indicating a resolution of a given simulated object, a frame rate property indicating a frame rate of the simulated object, or a reflectance property indicating a reflectance of the given simulated object. In other embodiments, the one or more properties of the baseline spectral bands 220 may comprise a resolution property indicating a resolution of the baseline version of the simulated object, a frame rate property indicating a frame rate of the baseline version of the simulated object, and a reflectance property indicating a reflectance of the baseline version of the simulated object. The hyperspectral image analysis 200 may generate multiple results 230 (e.g., property results 232-236) showing whether each simulated spectral band (e.g., bands 212-216) of the simulated spectral bands 210 is equal or different to a corresponding baseline spectral band (e.g., bands 222-226) of the baseline spectral bands 220. As described above, the results 230 may indicate that a given simulated object is tampered if any one simulated spectral band is different from a corresponding baseline spectral band. Further, the results 230 may indicate that a given simulated object is untampered if the simulated spectral bands are equal to corresponding baseline spectral bands. The simulated objects may be stationary simulated objects such as the gas station (e.g., simulated object 208) or moving simulated objects such as the motor vehicle (e.g., simulated object 206).

In some embodiments, the resolution of a simulated object may be a detail that images of the simulated object hold. The resolution of the simulated object may be represented as a change of detail in an image over multiple wavelengths. The units of the resolution may be pixels per units of an area. Further, the frame rate may be a speed at which images of the simulated object generated for playback. The frame rate of the simulated object may be represented as a change of a frequency in which images of the simulated object are shown. The units of the frame rate may be frames or images per second. In addition, the reflectance may be a proportion of perpendicularly incident light reflected from a component compared to that reflected from a standard of known reflectance at different wavelengths. In the hyperspectral image analysis, the reflectance may be represented as a change of reflected light over multiple wavelengths. The reflectance may not have units given its nature as a ratio. The resolution, the frame rate or the reflectance may be calculated by the user device 106A in real-time upon identifying rendered images of the given simulated object in the display 120.

In the example of FIG. 2, taking the simulated object 206 as a non-limiting example, a simulated spectral band 212 is compared to a baseline spectral band 222 and a property result 232 is generated to determine that a first spectral band is untampered. Further, a simulated spectral band 214 is compared to a baseline spectral band 224 and a property result 234 is generated to determine that a second spectral band is tampered. In addition, a simulated spectral band 216 is compared to a baseline spectral band 226 and a property result 236 is generated to determine that a third spectral band is untampered. In this regard, the user device 106A may determine that the simulated object 206 is tampered because at least one property result (e.g., the property result 234) indicates that a property of one simulated spectral band (e.g., band 214) is not equal to a corresponding property of another baseline spectral band 220 (e.g., band 224). Examples of comparisons are described in reference to property comparisons 300A-300C of FIGS. 3A-3C.

In one or more embodiments, the simulated object 206 may be analyzed via hyperspectral image analyses by measuring spectral differences between pixels forming the simulated spectral bands 210 and pixels forming the baseline spectral bands 220 over time. The continuous analyses enable the user device 106A to monitor a permissible range of differences in pixels showing the simulated object 206. In this regard, the user device 106A compares different wavelength properties of the simulated object 206 to capture and identify any partial mismatch between one or more properties of the simulated object 206. In some embodiments, each comparison may correspond to a same wavelength property. For example, in FIG. 2, a first comparison may compare a resolution of the band 212 and a resolution of the band 222; a second comparison may compare a reflectance of the band 214 and a reflectance of the band 224; and a first comparison may compare a frame rate of the band 216 and a frame rate of the band 226 over a predetermined time period. In other embodiments, each comparison may correspond to a unique wavelength property. For example, in FIG. 2, a first comparison may compare a reflectance of the band 212 and a reflectance of the band 222 at a first time; a second comparison may compare a reflectance of the band 214 and a reflectance of the band 224 at a second time; and a first comparison may compare a reflectance of the band 216 and a reflectance of the band 226 at a third time over a predetermined time period.

In one or more embodiments, reflectance values from multiple spectral bands may be compared for currently rendered simulation objects against baseline versions of the simulated object, and a potential alert is generated if the reflectance values vary significantly (e.g., if the difference is larger than a first predetermined threshold or is not within a second predetermined threshold).

Example Property Comparisons

FIGS. 3A-3C illustrate graphs showing examples of property comparisons 300A-300C, respectively. Each property comparison includes a simulation property corresponding to a simulated object rendered using one of the rendering commands 138 and a baseline property corresponding to a baseline version of the simulated object in accordance with one of the baseline rendering commands 140. The property comparisons 300A-300C may be examples of comparisons performed during the hyperspectral image analyses. As a non-limiting example, the property comparisons 300A-300C represent comparisons of reflectance between rendered images and base images associated with a same simulation object. As described above, a positive result (e.g., properties match) across the multiple spectral bands of a given simulated object indicate that the given simulated object is untampered. Further, a negative result (e.g., properties do not match) of any spectral band of the multiple spectral bands of the given simulated object indicate that the given simulated object is tampered.

In FIGS. 3A-3C, a reflectance of a rendered image of a simulated object is shown superimposed against a reflectance of a base image provided via a corresponding baseline version of the simulated object. As described above, reflectance is the proportion of perpendicularly incident light reflected from a component compared to that reflected from a standard of known reflectance. In these comparisons, the reflectance may be determined by evaluating each pixel of the simulated object and comparing these pixels to a corresponding baseline version of the simulated object over a range of wavelength values. In the examples of FIGS. 3A-3C, the reflectance scale is from 0 to 100 (unitless) and the wavelength is in a scale from 0 to 60 nano meters (nm). As non-limiting examples, the wavelengths shown are from a continuous range from 0 nm to around 55 nm.

In FIG. 3A, the property comparison 300A includes a simulation property shown as a first graph that reaches a first maximum reflectance of 80 at about the 37 nm wavelength. Further, a corresponding baseline property is shown as a second graph that reaches a second maximum reflectance of 50 at about the 37 nm wavelength. In this case, while both graphs generally follow a same shape and pattern, there is a clear difference 310 between the reflectance shown in the first graph and the reflectance shown in the second graph at the 37 nm wavelength. In the hyperspectral image analysis 200, the difference 310 may indicate a result showing that the reflectance of the rendered images of the simulated object and a base image of a baseline version were not equal to one another. As such, this result would indicate that the associated simulated object is tampered.

In FIG. 3B, the property comparison 300B includes a simulation property shown as a third graph that reaches a third maximum reflectance of about 93 at about the 50 nm wavelength. Further, a corresponding baseline property is shown as a fourth graph that reaches a fourth maximum reflectance of nearly 93 at about the same 50 nm wavelength. In this case, while the graphs are not identical, there is a clear similarity 320 between the reflectance shown in the third graph and the reflectance shown in the fourth graph over the entire wavelength. In the hyperspectral image analysis 200, the similarity 320 may indicate a result showing that the reflectance of the rendered images of the simulated object and a base image of a baseline version were equal to one another. As such, this result would indicate that the associated simulated object is untampered.

In FIG. 3C, the property comparison 300C includes a simulation property shown as a fifth graph that reaches a fifth maximum reflectance of about 52 at about the 17 nm wavelength. Further, a corresponding baseline property is shown as a sixth graph that reaches a sixth maximum reflectance of nearly 52 at about the 37 nm wavelength. In this case, while both graphs generally reach a same maximum value, there is a clear difference 320 between the wavelengths at which the maximum reflectance is shown in the fifth graph and the maximum reflectance is shown in the sixth graph. In the hyperspectral image analysis 200, the difference 320 may indicate a result showing that the reflectance of the rendered images of the simulated object and a base image of a baseline version were not equal to one another. As such, this result would indicate that the associated simulated object is tampered.

In one or more embodiments, the differences or similarities among the rendered images and the base images may be preconfigured as a tolerance value or a threshold. For example, in order to determine that there is a difference between two properties, one graph may be a percentage different from another graph. In another example, in order to determine that there are similarities between two properties, one graph may be a percentage similar to another graph.

Example Process

FIG. 4 illustrates an example flowchart of a process 400 to identify and reverse tampering on virtual images of simulated objects in a simulated environment, in accordance with one or more embodiments. Modifications, additions, or omissions may be made to the process 400. The process 400 may include more, fewer, or other operations than those shown below. For example, operations may be performed in parallel or in any suitable order. While at times discussed as the real-world server 100, the simulated-world server 100, the user device 100A, or components of any of thereof performing operations described in the operations, any suitable system or components of the system 100 may perform one or more operations of the process 400. For example, one or more operations of process 400 may be implemented, at least in part, in the form of real-world instructions 160, the simulated-world instructions 184, or the device instructions 136 of FIG. 1, stored on non-transitory, tangible, machine-readable media (e.g., the memory registry 154, the simulated-world memory 174, or the device memory 132 of FIG. 1) that when run by one or more processors (e.g., the real-world processor 152, the simulated-world processor 172, or the device processor 126 of FIG. 1) may cause the one or more processors to perform operations described in operations 402-434.

The process 400 starts at operation 402, where the user device 106A transmits a validation profile (e.g., of the one or more validation profiles 134) comprising multiple credentials 142 associated with accessing the simulated environment 102 to the memory registry 154. In some embodiments, the user device 106A transmits the validation profile to the simulated-world memory 174. At the memory registry 154 or the simulated-world memory 174, the credentials 142 may be validated or registered to start an access process in which the user 108 may enter the simulated environment 102 via the digital entity 104A.

The process 400 continues at operation 410, where the server determines whether the credentials 142 correspond to the digital entity 104A in the simulated environment 104. If the credentials are not associated with the digital entity 104A (e.g., NO), the process 400 proceeds to operation 412. At operation 412, the user device 106A loses access to the simulated environment 102. In one or more embodiments, if the credentials 142 are not matched such that the validation profile cannot be found in the real-world user profiles 162 or the simulated-world user profiles 178, the user device 106A may be held from entering the simulated environment 102. If the credentials 142 are associated with the digital entity 104A (e.g., YES), the process 400 proceeds to operation 414. At operation 414, the user device 106A renders a simulated object (e.g., the simulated object 206 or the simulated object 208) in the simulated environment 102 based at least in part upon a rendering command out of the multiple rendering commands 138 over a time period. At operation 416, the user device 106A displays the simulated environment 102 in the display 120 including the simulated object. At operation 418, the user device 106A retrieves from the memory registry 154 or the simulated-world memory 174, one or more baseline rendering commands 140 to render a baseline version of the simulated object in the simulated environment 102. At operation 420, the user device 106A performs the hyperspectral imaging analysis 200 of the simulated object in the simulated environment 102. As described in reference to FIGS. 1 and 2, the hyperspectral imaging analysis 200 evaluates whether the rendered images of the simulated object are tampered or untampered.

The process 400 continues at operation 430, where the user device 106A determines whether the simulated object is tampered or untampered. If the simulated object is tampered (e.g., YES), the process 400 proceeds to operation 432. If the simulated object is untampered (e.g., NO), the process 400 proceeds to operation 434. In operation 430, the user device 106A compares one or more spectral bands of the rendered image to one or more spectral bands of a base image as shown in FIG. 2 to determine whether the simulated object is tampered or untampered.

The process 600 ends at operation 432 or operation 434. At operation 432, the user device 106A replaces the simulated object with the baseline version in the simulated environment 102. At operation 434, the user device 106A identifies the rendering command of the multiple rendering commands 138 as a validated rendering command to render the simulated object in a subsequent time period.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. An apparatus, comprising:
a memory configured to store:
   a validation profile comprising a plurality of credentials associated with accessing a simulated environment, wherein the simulated environment comprises a virtual reality, augmented reality, or meta-verse environment; and
   a plurality of rendering commands to render one or more simulated objects in the simulated environment;
a processor communicatively coupled to the memory and configured to:
   transmit the validation profile to a registry in which each credential of the plurality of credentials is confirmed as belonging to a corresponding digital entity in the simulated environment, the corresponding digital entity being configured to interact with the one or more simulated objects in the simulated environment;
   render a first simulated object of the one or more simulated objects in the simulated environment based at least in part upon a first rendering command of the plurality of rendering commands over a first time period;
   display the simulated environment comprising the first simulated object;
   retrieve, from the registry, a first baseline rendering command to render a first baseline version of the first simulated object;
   perform a first hyperspectral imaging analysis of the first simulated object in the simulated environment;
   determine whether the first simulated object is tampered or untampered based at least in part upon a first result of the first hyperspectral imaging analysis indicating whether the first simulated object is different from the first baseline version, wherein:
      the first simulated object is tampered if the first result of the first hyperspectral imaging analysis indicates that the first simulated object is different from the first baseline version; and
      the first simulated object is untampered if the first result of the first hyperspectral imaging analysis indicates that the first simulated object and the first baseline version are equal to one another;
   block further interactions with the simulated environment in response to the determining that the first simulated object is tampered; and
   render an untampered version of the first simulated object in the simulated environment over a second time period in response to the determining that the first simulated object is untampered.

2. The apparatus of claim 1, wherein the processor is further configured to:
   in conjunction with performing the hyperspectral imaging analysis, identify a plurality of simulated spectral bands from the first simulated object in the simulated environment;
   retrieve a plurality of baseline spectral bands associated with the first baseline version;
   compare one or more properties of a first simulated spectral band of the plurality of simulated spectral bands to one or more properties of a first baseline spectral band of the plurality of baseline spectral bands;
   in response to determining that the one or more properties of the first simulated spectral band are different to the one or more properties of the first baseline spectral band, generate the result indicating that the simulated object is tampered; and
   in response to determining that the one or more properties of the first simulated spectral band and the one or more properties of the first baseline spectral band are equal to one another, generate the result indicating that the simulated object is untampered.

3. The apparatus of claim 2, wherein the processor is further configured to:
   in conjunction with identifying the plurality of simulated spectral bands from the simulated object in the simulated environment, compare one or more properties of a second simulated spectral band of the plurality of simulated spectral bands to one or more properties of a second baseline spectral band of the plurality of baseline spectral bands;
   determine that the one or more properties of the second simulated spectral band are different to the one or more properties of the second baseline spectral band;
   compare one or more properties of a third simulated spectral band of the plurality of simulated spectral bands to one or more properties of a third baseline spectral band of the plurality of baseline spectral bands;
   in response to determining that the one or more properties of the third simulated spectral band are different to the one or more properties of the third baseline spectral band, generate the result indicating that the simulated object is tampered; and
   in response to determining that the one or more properties of the third simulated spectral band and the one or more properties of the third baseline spectral band are equal to one another, generate the result indicating that the simulated object is tampered.

4. The apparatus of claim 2, wherein the one or more properties comprise a resolution property, a frame rate property, and a reflectance property.

5. The apparatus of claim 1, wherein the processor further configured to:
render a second simulated object of the one or more simulated objects in the simulated environment based at least in part upon a second rendering command of the plurality of rendering commands over a third time period;
display the simulated environment comprising the second simulated object;
retrieve, from the registry, one or more second baseline rendering commands to render a second baseline version of the second simulated object;
perform a second hyperspectral imaging analysis of the second simulated object in the simulated environment;
determine whether the second simulated object is tampered or untampered based at least in part upon a second result of the second hyperspectral imaging analysis indicating whether the second simulated object is different from the second baseline version, wherein:
the second simulated object is tampered if the second result of the second hyperspectral imaging analysis indicates that the second simulated object is different from the second baseline version; and
the second simulated object is untampered if the second result of the second hyperspectral imaging analysis indicates that the second simulated object and the second baseline version are equal to one another;
in response to determining that the second simulated object is tampered, replace the second simulated object with the second baseline version in the simulated environment; and
in response to determining that the second simulated object is untampered, identify the second rendering command as a validated rendering command to render an untampered version of the second simulated object in the simulated environment over a fourth time period.

6. The apparatus of claim 1, wherein the processor further configured to:
generate an alert indicating that the first simulated object is tampered; and
display the alert as an overlay in the simulated environment.

7. The apparatus of claim 1, wherein the first time period and the second time period do not overlap.

8. A method, comprising:
transmitting, by a processor, a validation profile to a registry in which each credential of a plurality of credentials is confirmed as belonging to a corresponding digital entity in a simulated environment, wherein:
the simulated environment comprises a virtual reality, augmented reality, or meta-verse environment;
the validation profile comprises the plurality of credentials associated with accessing the simulated environment;
the corresponding digital entity is configured to interact with one or more simulated objects in the simulated environment; and
the one or more simulated objects are rendered in the simulated environment at least in part upon a plurality of rendering commands to render;
rendering, by the processor, a first simulated object of the one or more simulated objects in the simulated environment based at least in part upon a first rendering command of the plurality of rendering commands over a first time period;
displaying, via a display, the simulated environment comprising the first simulated object;
retrieving, from the registry, a first baseline rendering command to render a first baseline version of the first simulated object;
performing, by the processor, a first hyperspectral imaging analysis of the first simulated object in the simulated environment;
determining, by the processor, whether the first simulated object is tampered or untampered based at least in part upon a first result of the first hyperspectral imaging analysis indicating whether the first simulated object is different from the first baseline version, wherein:
the first simulated object is tampered if the first result of the first hyperspectral imaging analysis indicates that the first simulated object is different from the first baseline version; and
the first simulated object is untampered if the first result of the first hyperspectral imaging analysis indicates that the first simulated object and the first baseline version are equal to one another;
blocking further interactions with the simulated environment in response to the determining that the first simulated object is tampered; and
rendering an untampered version of the first simulated object in the simulated environment over a second time period in response to the determining that the first simulated object is untampered.

9. The method of claim 8, further comprising:
in conjunction with performing the hyperspectral imaging analysis, identifying a plurality of simulated spectral bands from the first simulated object in the simulated environment;
retrieving, by the processor, a plurality of baseline spectral bands associated with the first baseline version;
comparing, by the processor, one or more properties of a first simulated spectral band of the plurality of simulated spectral bands to one or more properties of a first baseline spectral band of the plurality of baseline spectral bands;
in response to determining that the one or more properties of the first simulated spectral band are different to the one or more properties of the first baseline spectral band, generating the result indicating that the simulated object is tampered; and
in response to determining that the one or more properties of the first simulated spectral band and the one or more properties of the first baseline spectral band are equal to one another, generating the result indicating that the simulated object is untampered.

10. The method of claim 9, further comprising:
in conjunction with identifying the plurality of simulated spectral bands from the simulated object in the simulated environment, comparing one or more properties of a second simulated spectral band of the plurality of simulated spectral bands to one or more properties of a second baseline spectral band of the plurality of baseline spectral bands;
determining, by the processor, that the one or more properties of the second simulated spectral band are different to the one or more properties of the second baseline spectral band;
comparing, by the processor, one or more properties of a third simulated spectral band of the plurality of simulated spectral bands to one or more properties of a third baseline spectral band of the plurality of baseline spectral bands;

in response to determining that the one or more properties of the third simulated spectral band are different to the one or more properties of the third baseline spectral band, generating the result indicating that the simulated object is tampered; and in response to determining that the one or more properties of the third simulated spectral band and the one or more properties of the third baseline spectral band are equal to one another, generating the result indicating that the simulated object is tampered.

11. The method of claim 9, wherein the one or more properties comprise a resolution property, a frame rate property, and a reflectance property.

12. The method of claim 8, further comprising:

rendering, by the processor, a second simulated object of the one or more simulated objects in the simulated environment based at least in part upon a second rendering command of the plurality of rendering commands over a third time period;

displaying, via the display, the simulated environment comprising the second simulated object;

retrieving, from the registry, one or more second baseline rendering commands to render a second baseline version of the second simulated object;

performing, by the processor, a second hyperspectral imaging analysis of the second simulated object in the simulated environment;

determining, by the processor, whether the second simulated object is tampered or untampered based at least in part upon a second result of the second hyperspectral imaging analysis indicating whether the second simulated object is different from the second baseline version, wherein:

the second simulated object is tampered if the second result of the second hyperspectral imaging analysis indicates that the second simulated object is different from the second baseline version; and the second simulated object is untampered if the second result of the second hyperspectral imaging analysis indicates that the second simulated object and the second baseline version are equal to one another;

in response to determining that the second simulated object is tampered, replacing the second simulated object with the second baseline version in the simulated environment; and in response to determining that the second simulated object is untampered, identifying the second rendering command as a validated rendering command to render an untampered version of the second simulated object in the simulated environment over a fourth time period.

13. The method of claim 8, further comprising:

generating, by the processor, an alert indicating that the first simulated object is tampered; and displaying, via the display, the alert as an overlay in the simulated environment.

14. The method of claim 8, wherein the first time period and the second time period do not overlap.

15. A non-transitory computer readable medium storing instructions that when executed by a processor cause the processor to:

transmit a validation profile to a registry in which each credential of a plurality of credentials is confirmed as belonging to a corresponding digital entity in a simulated environment, wherein:

the simulated environment comprises a virtual reality, augmented reality, or meta-verse environment;

the validation profile comprises the plurality of credentials associated with accessing the simulated environment;

the corresponding digital entity is configured to interact with one or more simulated objects in the simulated environment; and the one or more simulated objects are rendered in the simulated environment at least in part upon a plurality of rendering commands to render;

render a first simulated object of the one or more simulated objects in the simulated environment based at least in part upon a first rendering command of the plurality of rendering commands over a first time period;

display, via a display, the simulated environment comprising the first simulated object;

retrieve, from the registry, a first baseline rendering command to render a first baseline version of the first simulated object;

perform, by the processor, a first hyperspectral imaging analysis of the first simulated object in the simulated environment;

determine, by the processor, whether the first simulated object is tampered or untampered based at least in part upon a first result of the first hyperspectral imaging analysis indicating whether the first simulated object is different from the first baseline version, wherein:

the first simulated object is tampered if the first result of the first hyperspectral imaging analysis indicates that the first simulated object is different from the first baseline version; and the first simulated object is untampered if the first result of the first hyperspectral imaging analysis indicates that the first simulated object and the first baseline version are equal to one another;

block further interactions with the simulated environment in response to the determining that the first simulated object is tampered; and render an untampered version of the first simulated object in the simulated environment over a second time period in response to the determining that the first simulated object is untampered.

16. The non-transitory computer readable medium of claim 15, wherein the instructions further cause the processor to:

in conjunction with performing the hyperspectral imaging analysis, identify a plurality of simulated spectral bands from the first simulated object in the simulated environment;

retrieve a plurality of baseline spectral bands associated with the first baseline version;

compare one or more properties of a first simulated spectral band of the plurality of simulated spectral bands to one or more properties of a first baseline spectral band of the plurality of baseline spectral bands;

in response to determining that the one or more properties of the first simulated spectral band are different to the one or more properties of the first baseline spectral band, generate the result indicating that the simulated object is tampered; and in response to determining that the one or more properties of the first simulated spectral band and the one or more properties of the first baseline spectral band are equal to one another, generate the result indicating that the simulated object is untampered.

17. The non-transitory computer readable medium of claim 16, wherein the instructions further cause the processor to:
in conjunction with identifying the plurality of simulated spectral bands from the simulated object in the simulated environment, compare one or more properties of a second simulated spectral band of the plurality of simulated spectral bands to one or more properties of a second baseline spectral band of the plurality of baseline spectral bands;
determine that the one or more properties of the second simulated spectral band are different to the one or more properties of the second baseline spectral band;
compare one or more properties of a third simulated spectral band of the plurality of simulated spectral bands to one or more properties of a third baseline spectral band of the plurality of baseline spectral bands;
in response to determining that the one or more properties of the third simulated spectral band are different to the one or more properties of the third baseline spectral band, generate the result indicating that the simulated object is tampered; and
in response to determining that the one or more properties of the third simulated spectral band and the one or more properties of the third baseline spectral band are equal to one another, generate the result indicating that the simulated object is tampered.

18. The non-transitory computer readable medium of claim 16, wherein the one or more properties comprise a resolution property, a frame rate property, and a reflectance property.

19. The non-transitory computer readable medium of claim 15, wherein the instructions further cause the processor to:
render a second simulated object of the one or more simulated objects in the simulated environment based at least in part upon a second rendering command of the plurality of rendering commands over a third time period;
display, via the display, the simulated environment comprising the second simulated object;
retrieve, from the registry, one or more second baseline rendering commands to render a second baseline version of the second simulated object;
perform a second hyperspectral imaging analysis of the second simulated object in the simulated environment;
determine whether the second simulated object is tampered or untampered based at least in part upon a second result of the second hyperspectral imaging analysis indicating whether the second simulated object is different from the second baseline version, wherein:
the second simulated object is tampered if the second result of the second hyperspectral imaging analysis indicates that the second simulated object is different from the second baseline version; and
the second simulated object is untampered if the second result of the second hyperspectral imaging analysis indicates that the second simulated object and the second baseline version are equal to one another;
in response to determining that the second simulated object is tampered, replace the second simulated object with the second baseline version in the simulated environment; and
in response to determining that the second simulated object is untampered, identify the second rendering command as a validated rendering command to render an untampered version of the second simulated object in the simulated environment over a fourth time.

20. The non-transitory computer readable medium of claim 15, wherein the first time period and the second time period do not overlap.

* * * * *